(12) United States Patent
Hamdi

(10) Patent No.: US 11,907,730 B2
(45) Date of Patent: Feb. 20, 2024

(54) SYSTEMS AND METHODS FOR IDENTIFYING AND MANAGING MUTUALLY INDEPENDENT COMPUTER SUBSYSTEMS

(71) Applicant: Acentium Inc, Boston, MA (US)

(72) Inventor: Amine Hamdi, Boston, MA (US)

(73) Assignee: Acentium Inc, Boston, MA (US)

( * ) Notice: Subject to any disclaimer, the term of this patent is extended or adjusted under 35 U.S.C. 154(b) by 374 days.

(21) Appl. No.: 17/154,126

(22) Filed: Jan. 21, 2021

(65) Prior Publication Data
US 2021/0240496 A1    Aug. 5, 2021

Related U.S. Application Data

(60) Provisional application No. 62/964,411, filed on Jan. 22, 2020.

(51) Int. Cl.
| | |
|---|---|
| *G06F 1/24* | (2006.01) |
| *G06F 9/00* | (2006.01) |
| *G06F 9/445* | (2018.01) |
| *G06Q 40/08* | (2012.01) |
| *H04L 9/40* | (2022.01) |

(52) U.S. Cl.
CPC ......... *G06F 9/44505* (2013.01); *G06Q 40/08* (2013.01); *H04L 63/1416* (2013.01)

(58) Field of Classification Search
CPC .. G06F 9/44505; G06F 21/577; G06F 21/552; G06Q 40/08; H04L 63/1416; H04L 63/0209; H04L 41/12; H04L 41/145; H04L 63/1433
See application file for complete search history.

(56) References Cited

U.S. PATENT DOCUMENTS

| | | | |
|---|---|---|---|
| 9,537,720 B1 * | 1/2017 | Baggott | G06F 9/45558 |
| 10,257,219 B1 * | 4/2019 | Geil | G06F 16/24578 |
| 10,425,489 B1 | 9/2019 | El Defrawy et al. | |

(Continued)

FOREIGN PATENT DOCUMENTS

EP    3 241 331    11/2017

OTHER PUBLICATIONS

International Preliminary Report on Patentability on PCT Appl. Ser. No. PCT/US2021/014361 dated Aug. 4, 2022 (9 pages).

(Continued)

*Primary Examiner* — Xuxing Chen
(74) *Attorney, Agent, or Firm* — Foley & Lardner LLP

(57) ABSTRACT

Systems and methods for determining subsystems of a computer environment that are in a mutual independence state can include a computing device obtaining information indicative of a group of assets of a subsystem of a computer environment. For each asset of the group of assets, the computing device can identify one or more first assets on which the asset depends and one or more second assets that depend on the asset, and determine whether the one or more first assets and the one or more second assets belong to the group of assets. The computing device can determine that the subsystem is in a mutual independence state upon determining, for each asset of the group of assets, that the first and second assets belong to the group of assets. The computing device can update a data record to indicate the determined state of subsystem of the computer environment.

20 Claims, 17 Drawing Sheets

(56) References Cited

U.S. PATENT DOCUMENTS

2019/0166011 A1* 5/2019 Cordray .............. G06F 15/173
2019/0349733 A1* 11/2019 Nolan ................ H04L 41/0806
2021/0021628 A1* 1/2021 Sbandi ................. H04L 63/20
2022/0413970 A1* 12/2022 Tormasov ........... G06F 11/1464

OTHER PUBLICATIONS

International Search Report regarding PCT/US2021/014361 dated Jul. 29, 2021.
Written Opinion of the International Searching Authority regarding PCT/US2021/014361 dated Jul. 29, 2021.

* cited by examiner

SYSTEMS AND METHODS FOR IDENTIFYING AND MANAGING MUTUALLY INDEPENDENT COMPUTER SUBSYSTEMS

CROSS REFERENCE TO RELATED APPLICATIONS

This application claims priority to, and the benefit of, U.S. Provisional Application No. 62/964,411 filed on Jan. 22, 2020, and entitled "SYSTEMS AND METHODS FOR IDENTIFYING AND MANAGING MUTUALLY INDEPENDENT COMPUTER SUBSYSTEMS," which is incorporated herein by reference in its entirety.

FIELD OF THE DISCLOSURE

The present application relates generally to systems and methods for identifying and monitoring mutually independent computer systems (also referred to herein as "capsules") in a computer environment. Specifically, the present application relates to (i) determining whether a group or a cluster of computer assets, within a computer environment, is in a mutual independence state (or capsule state) with respect to other assets in the computer environment, and/or (ii) managing the group of computer assets or the computer environment (e.g., with respect to cybersecurity policies, monitoring policies, risk assessment and management, threat response, etc.) based on such determination.

SUMMARY OF THE DISCLOSURE

According to at least one aspect, a system can include one or more processors and a memory configured to cause the system to obtain information indicative of a group of assets of a subsystem of a computer environment. For each asset of the group of assets, the system can identify one or more first assets of the computer environment on which the asset depends and one or more second assets of the computer environment that depend on the asset, and determine whether the one or more first assets and the one or more second assets belong to the group of assets. The system can determine that the subsystem of the computer environment is in a mutual independence state upon determining, for each asset of the group of assets, that the one or more first assets and the one or more second assets belong to the group of assets. The system can update, responsive to determining that the subsystem of the computer environment is in a mutual independence state, a data record to indicate that the subsystem of the computer environment is in a mutual independence state.

According to at least one aspect, a method can include a computing device obtaining information indicative of a group of assets of a subsystem of a computer environment. The method can include, for each asset of the group of assets, the computing device identifying one or more first assets of the computer environment on which the asset depends and one or more second assets of the computer environment that depend on the asset, determining whether the one or more first assets and the one or more second assets belong to the group of assets. The method can include the computing device determining that the subsystem of the computer environment is in a mutual independence state upon determining, for each asset of the group of assets, that the one or more first assets and the one or more second assets belong to the group of assets. The method can include the computing device updating, responsive to determining that the subsystem of the computer environment is in a mutual independence state, a data record to indicate that the subsystem of the computer environment is in a mutual independence state.

According to at least one aspect, a computer-readable medium can include computer code instructions stored thereon. The computer code instructions when executed by one or more processors cause the one or more processors to obtain information indicative of a group of assets of a subsystem of a computer environment. The one or more processors can, for each asset of the group of assets, identify one or more first assets of the computer environment on which the asset depends and one or more second assets of the computer environment that depend on the asset, and determine whether the one or more first assets and the one or more second assets belong to the group of assets. The one or more processors determine that the subsystem of the computer environment is in a mutual independence state upon determining, for each asset of the group of assets, that the one or more first assets and the one or more second assets belong to the group of assets. The one or more processors update, responsive to determining that the subsystem of the computer environment is in a mutual independence state, a data record to indicate that the subsystem of the computer environment is in a mutual independence state.

DETAILED DESCRIPTION

For purposes of reading the description of the various embodiments below, the following descriptions of the sections of the specification and their respective contents may be helpful:

Section A describes a computing and network environment which may be useful for practicing embodiments described herein.

Section B describes monitoring solution stacks or subsystems of a computer ecosystem.

Section C describes solution stack monitoring as a diagnosis tool.

Section D. describes identification of mutually independent computer subsystems within a computer environment.

A. Computing and Network Environment

Figure 1A:
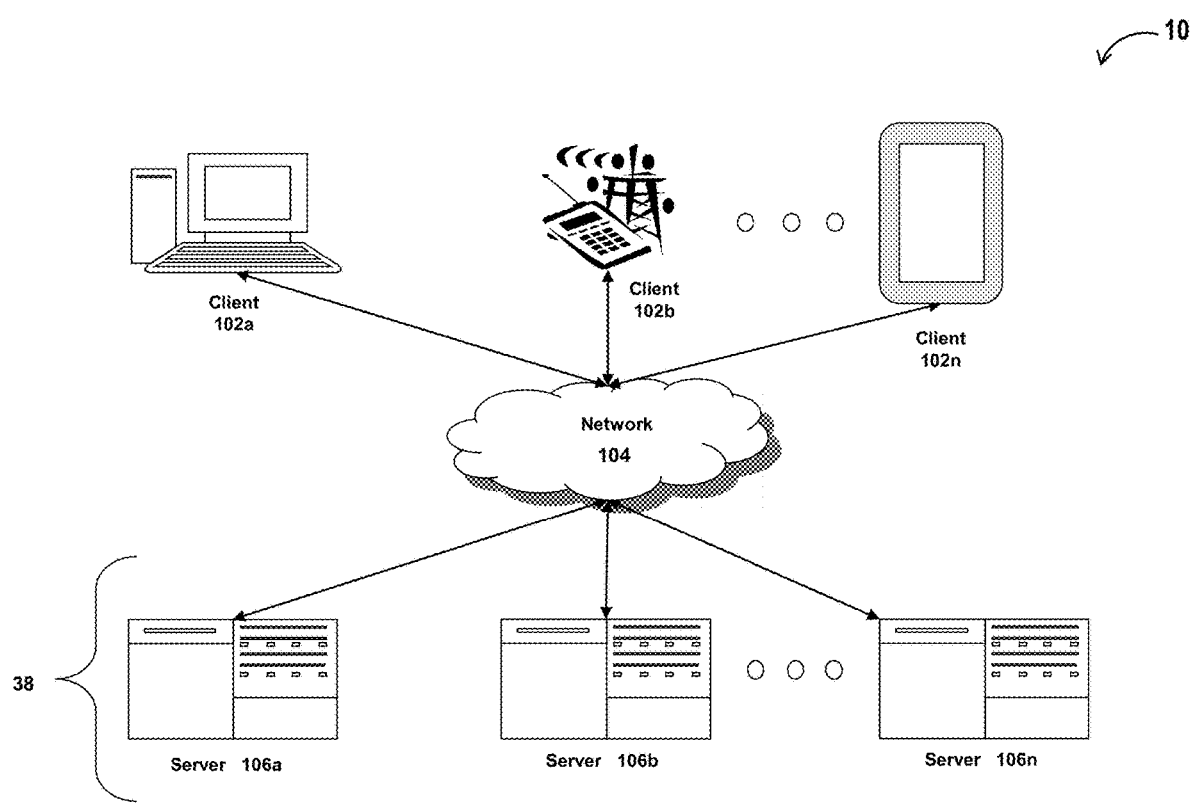
FIG. 1A is a block diagram depicting an embodiment of a computing and network environment.

In addition to discussing specific embodiments of the present solution, it may be helpful to describe aspects of the operating environment as well as associated system components (e.g., hardware elements) in connection with the methods and systems described herein. Referring to FIG. 1A, an embodiment of a computing and network environment 10 is depicted. In brief overview, the computing and network environment 10, also referred to herein as a computer environment 10, includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 1G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the computing and network environment 10 may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS 8 or 10, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, firewall, Internet of Things (IoT) controller. In one embodiment, the server 106 may be referred to as a remote machine or a node. In another embodiment, a plurality of nodes 290 may be in the path between any two communicating servers.

Figure 1B:
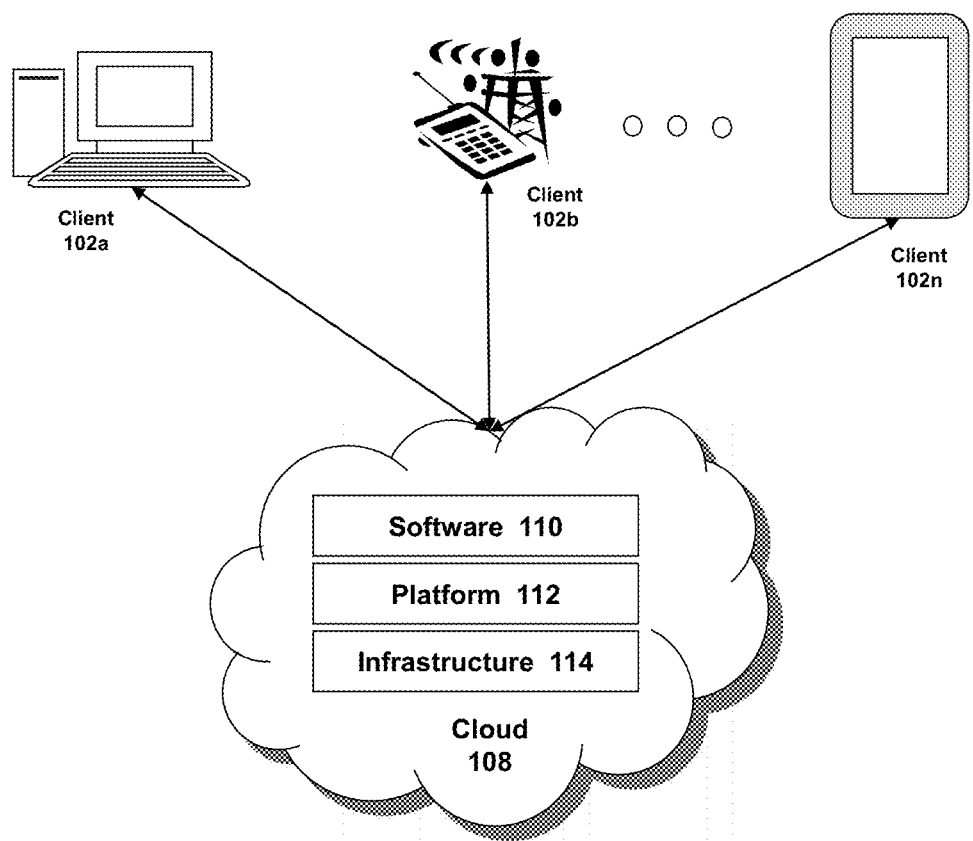
FIGS. 1B-1D are block diagrams depicting embodiments of computers useful in connection with the methods and systems described herein.

Referring to FIG. 1B, a cloud computing environment is depicted. The cloud computing environment can be part of the computing and network environment 10. A cloud computing environment may provide client 102 with one or more resources provided by the computing and network environment 10. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, for example, Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
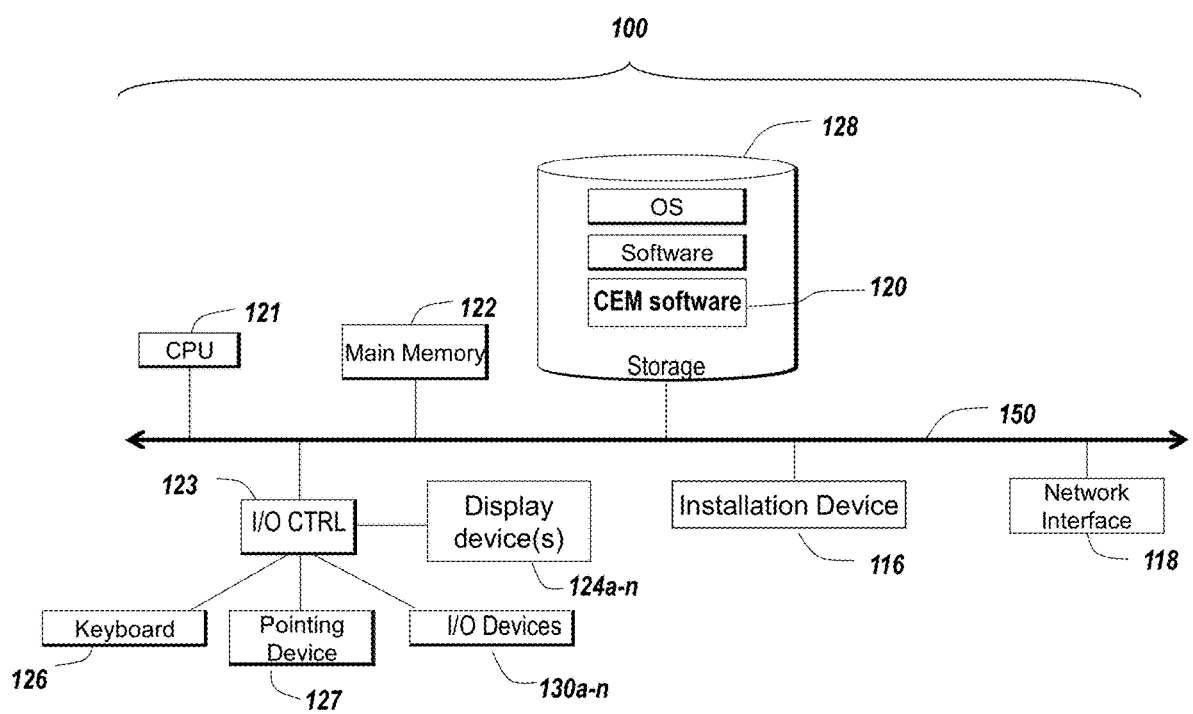
Figure 1D:
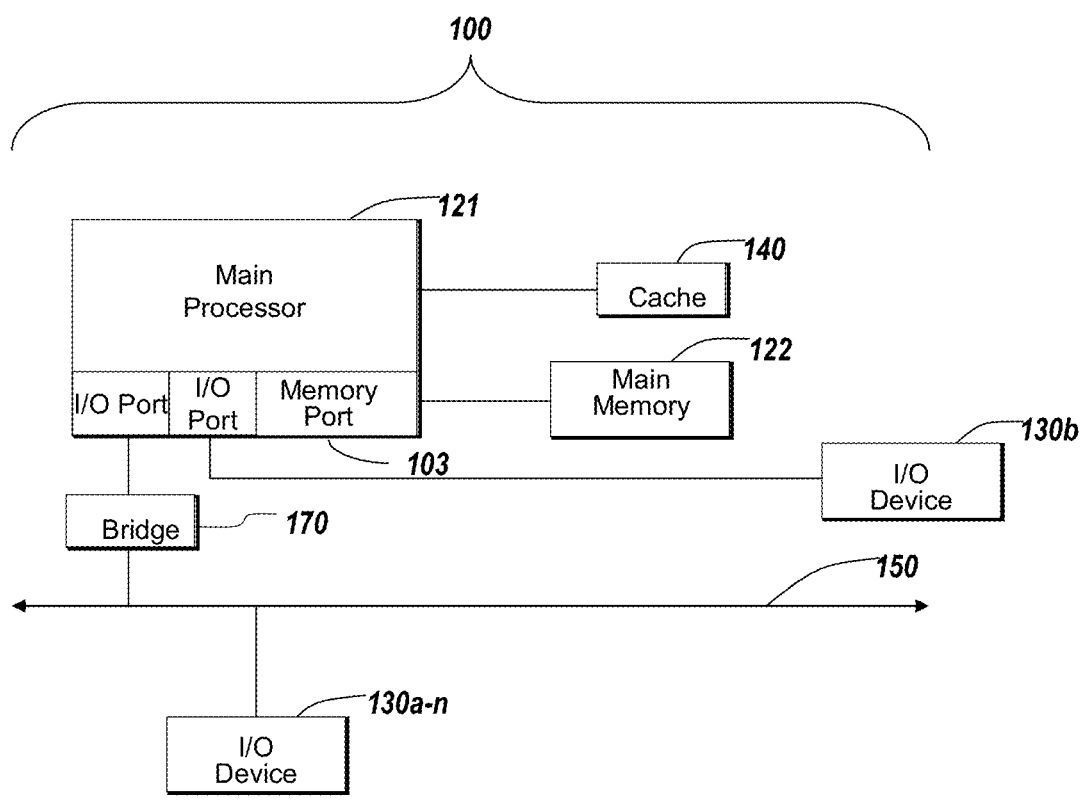

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, a computer environment monitoring (CNM) software 120, and/or other software, among others. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the CEM software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is a eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, central processing unit (CPU) and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Monitoring Solution Stacks or Subsystems of a Computer Ecosystem

The present disclosure relates to systems and methods for monitoring solution stacks, computer subsystems or assets thereof in a computer environment, such as the computing and network environment 10. Specifically, the current disclosure relates to intelligent generating and rendering of monitoring data of the computer environment, a solution stack, a computer subsystem or assets thereof. A computer environment is also referred to herein as a computer ecosystem. A solution stack as used herein can refer to a bundle of software components and/or hardware subsystems or devices associated with a corresponding solution, also referred to in some implementations as information technology (IT) solution. As used herein, an asset of the computer environment can be a software asset, a hardware asset, a data asset, a user or individual associated with the computer environment or a solution thereof, or a combination thereof. A software asset can include, for example, a software subsystem, a software server, a software code, a software component, or a script, among others. A hardware asset can include a hardware server, a client computing device, a storage device, a network device, a power device or system, a microprocessor, a microchip, a printed circuit board, a controller, a circuitry, a sensor, a camera, or other electric, electronic or electromechanical device, among others. A data asset can include a database, a data folder, a data file, a data structure or a combination thereof.

A solution can refer to a function to be performed, for example, within the computer environment/ecosystem. The solution can be a software solution, e.g., a function performed through software executing on one or more computing devices, a hardware-based solution or a combination thereof. In general, a solution stack can be viewed as the set of assets configured to provide a reliable and fully functioning corresponding solution. For instance, the solution stack can form a complete system or platform to provide the reliable and fully functioning corresponding solution. Solution stacks and corresponding solutions may be used, or referred to, herein interchangeably. Illustrative examples of solutions can include an enterprise email service such as MICROSOFT EXCHANGE, an instant messaging and/or a voice-over-IP (VOIP) service such as SKYPE for Business, a teleconferencing service, a document management service, a computerized accounting service, an electric power solution, for example, for a given enterprise office or site, a storage solution, a virtualization solution, a network solution, or a combination thereof, among others.

The software bundle for a corresponding solution can be sold as a single software package. A vendor may either sell only the software package or sell both the software package and the corresponding supporting and/or hosting hardware for a given solution. However, even when selling only the software package, the vendor may still provide specifications of the hardware infrastructure, such as the type and number of hardware assets, and/or the corresponding architecture (e.g., how the hardware assets are interconnected) specified or preferred to run and support the software bundle. The vendor may provide specified or preferred configuration settings or other settings for various assets of the solution stack, including hardware and/or software assets, or for the solution stack as a whole.

When a solution stack for a corresponding solution is built or integrated, for example, within a computer environment such as an enterprise computer network, the integration or building of the solution stack may not conform with specifications or requirements provided by the corresponding vendor. For example, the owner of the computer environment or the respective IT personnel may use a different hardware infrastructure, (e.g., in terms of the number, types or capabilities of computer servers or other devices used), different architecture (e.g., in terms of inter-connections between various assets) and/or different settings (e.g., configuration settings) than those specified or recommended by the vendor. Also, even if the solution stack is initially built, installed or integrated in compliance with the vendor's specifications or recommendations, intentional or inadvertent modifications of the solution stack may occur after the installation or deployment of the solution stack. For example, an IT administrator may intentionally or inadvertently add, remove or omit an asset of the solution stack, add, remove omit a physical or logical connection between two or more assets in the solution stack, or change a configuration setting or other setting for one or more assets of the solution stack, among others. Also, an asset or a subsystem (e.g., a firewall or a cybersecurity system among others) of the computer environment may automatically affect similar changes to the solution stack, for example, by quarantining an asset or modifying a setting parameter of an asset.

Changes or modifications to the solution stack made prior to, during or after deployment of the solution stack can negatively affect or jeopardize the functioning, performance, security, compliance, risk, and/or operational health, among others, of the corresponding solution. The changes or modifications to the solution stack can negatively affect or jeopardize the functioning, performance, security, compliance, risk, and/or operational health, among others, of another solution, another subsystem or another asset of the computer environment, or of the whole computer environment. For example, if the vendor specifications recommend or suggest hosting backend and frontend databases of a solution on separate servers, deploying or modifying the solution stack to host such databases on the same server can lead to a cybersecurity risk that can jeopardizing the security, availability and/or credibility of data stored in the backend database. For example, an intrusion of the server can expose both the frontend and backend databases. Also, reducing, e.g., at the deployment phase or after deployment of the solution stack, the number of servers recommended for the solution can cause performance, operational, compliance and/or security issues associated with the solution stack or other components of the computer environment. For instance, using a smaller number of servers (e.g., smaller than a number of servers specified by the vendor) can result in higher than planned processing load on the deployed servers or in mitigated or nullified redundancy. Overloading the deployed servers can reduce the respective processing speed and/or increase the number or rate of dropped tasks, while mitigating or nullifying redundancy can increase the likelihood of total failure of the solution. As another example, deployments of, or modifications to, a solution stack that violate a requirement or specification of not assigning a separate externally facing Internet Protocol (IP) address and a separate internally facing IP address to the same server can result in creating a cybersecurity hole, which can result in a backdoor that facilitates bypassing a firewall of the computer environment or other cybersecurity system. Such violation can occur, for example, in a deployed Skype™ edge server. Another example problem may occur when a firewall configuration wrongly indicates that a server, or asset, of the solution is meant or intended to communicate internally. In such example, the firewall can block, lock down or quarantine the server (or asset) and prevent it from communicating with an external entity (e.g., outside the computer environment), which can bring the whole solution or one or more functions thereof down.

The changes or modifications to any solution stack can occur at any point of time during or after deployment. As such, monitoring deployed solution stacks can help diagnose and overcome, or quickly address, technical problems or risks associated with inadequate builds or configurations, e.g., compared to reference solution profiles or specifications, of the solution stack or related assets. Specifically, monitoring a current state of a given solution stack can allow for detecting and addressing functional, performance, operational, compliance or security problems associated with the solution stack. The current state of the solution stack can include information indicative of the assets forming the solution stack, the configuration settings of the assets, the infrastructure interconnections between the assets, and/or the security-wise inter-relations between the assets, among others, at a current point of time. A CEM system can compare the current state to a reference or desired state of the solution stack to allow for correcting, or eliminating, any discrepancies between both states whenever desired, for example, to avoid or address any problems related to such discrepancies. In general, the CEM system can monitor a computer ecosystem or respective solution stacks, subsystems and/or assets.

The CEM system can include, for example, the CEM software 120 and one or more computing devices for executing the CEM software 120. The one or more computing devices can be part of, or communicatively connected to, the computer ecosystem or subsystems or solutions thereof. Upon detecting an architectural, configuration, operational, security or compliance problem (e.g., a solution stack is hosting frontend and backend databases on the same server) associated with a solution stack, subsystem or asset, the CEM system can alert one or more users, e.g., system administrators. When made aware of such problem, a system administrator can take proper steps to fix an inadequate build, deployment or configuration or fix a security or compliance issue.

Real time or near real-time (e.g., iteratively every few minutes) monitoring of the assets, architecture, and/or configuration of a deployed solution sack or subsystem can allow for continuous assessment of the performance health, the security health and/or the compliance to relevant regulations, among other aspects of the solution or the subsystem. The performance health can be defined, for example, based on usage or availability of processing resources, memory or storage resources, network resources or power resources, among other resources. The security health can be defined based on, or can be indicative of, vulnerabilities, security holes, or security risks, among others issues. The compliance of the solution stack can include compliance to business or legal regulations and/or rules, among others. Also, monitoring of the performance health, the security health and/or the compliance to relevant regulations and/or rules can help identify any effects the deployed solution stack or subsystem may have on other solution stacks, other subsystems or other assets of the computer environment. In many practical cases, monitoring separate solutions stacks, separate subsystems or relatively more important (e.g., from a business perspective or risk perspective) solution stacks or subsystems can be more efficient, more reliable and more productive than monitoring the whole computer environment. Also, monitoring separate solutions stacks or subsystems can allow for relatively quick and efficient responses to cybersecurity threats or attacks or other problems, for example, compared to monitoring the whole computer environment.

Figure 2:
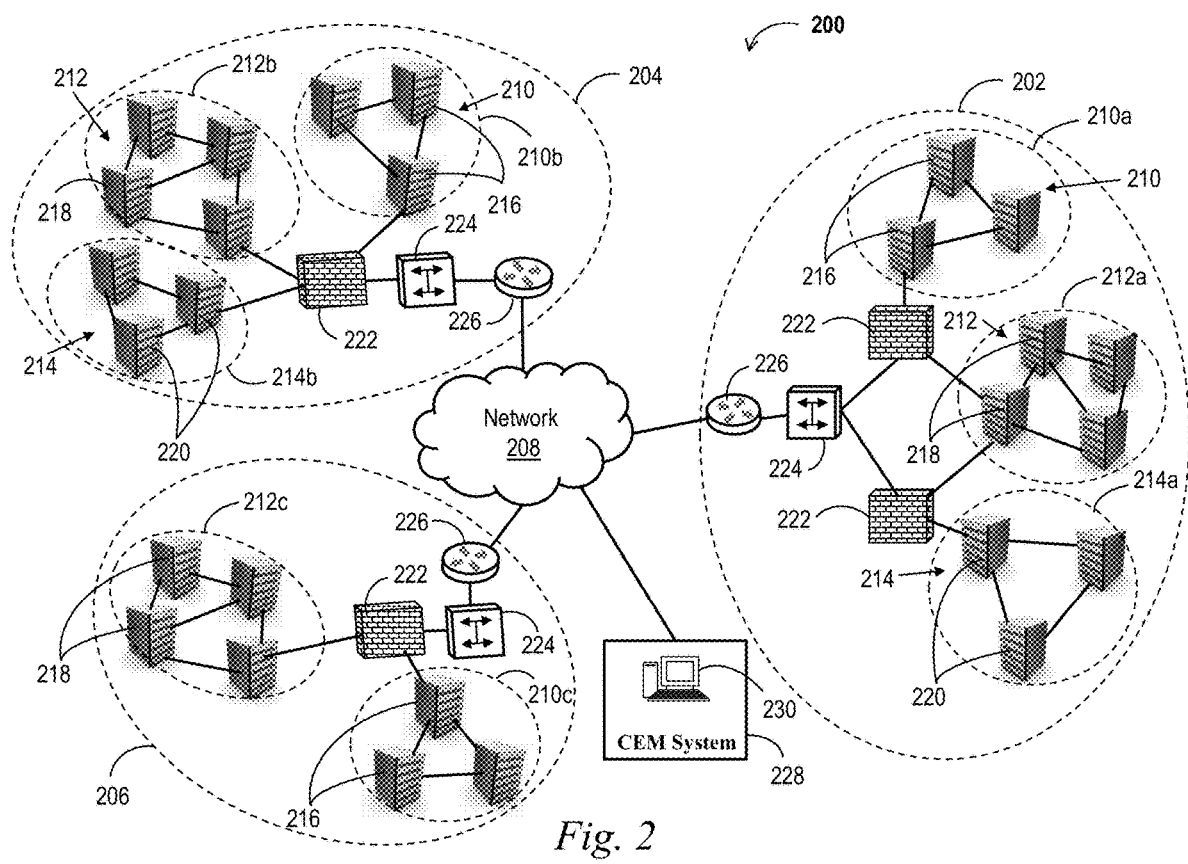
FIG. 2 is a block diagram illustrating an example computer environment hosting a plurality of solutions or subsystems.

Referring to FIG. 2, an example computer environment 200 hosting a plurality of IT solutions is depicted. The computer environment 200 can be, or can include, an enterprise or corporate computer network, a communication network, a power grid system, a network of remotely monitored or controlled medical devices, or a combination thereof, among others. The communication network can include a cellular network, landline network, optical network, metropolitan area network (MAN), or wide area network (WAN), among other networks. The computer environment 200 can be distributed over, or can include, a plurality of sites 202-206, for example, associated with distinct geolocations. The sites 202, 204 and 206 can be communicatively coupled or connected to each other through a communication network 208. The communications network 208 can include a local-area network (LAN), e.g. Intranet, a metropolitan area network (MAN), a wide area network (WAN), a wireless network, a private network, a public network, the Internet, or a combination thereof. A site, e.g., 202, 204 or 206, can include or can be a local computer sub-environment or network associated, for example, with a corporate office or industrial factory or site. A site, e.g., 202, 204 or 206, can be associated with a data center, for example, hosting a portion of the computer environment deployed in the cloud.

The computer environment 200 can include a plurality of solution stacks 210, 212 and 214 integrated or deployed therein. Each solution stack can be associated with, e.g., configured to provide, a corresponding solution. Each of the solution stacks 210, 212 and 214 can be distributed over one or more of the sites 202, 204 and 206. For example, solution stack 210 can include sub-stacks 210*a*, 210*b* and 210*c* arranged at sites 202, 204 and 206, respectively. Solution stack 212 can include sub-stacks 212*a*, 212*b* and 212*c* arranged at sites 202, 204 and 206, respectively. Solution stack 214 can include sub-stacks 214*a* and 214*b* arranged at sites 202 and 204, respectively. For any of the solution stacks 210, 212 or 214, each of (or at least one of) the corresponding sub-stacks can represent a full solution stack. For example, the corresponding sub-stacks can be clones or copies of each other. In some implementations, the sub-stacks for any of the solution stacks 210, 212 or 214 can form a full solution stack in combination. Each solution stack 210, 212 or 214 can include a corresponding plurality of assets. For example, solution stack 210 can include a plurality of assets 216, solution stack 212 can include a plurality of assets 218, and solution stack 214 can include a plurality of assets 220. For each solution stack 210, 212 or 214, the corresponding assets can include hardware assets, software assets or a combination of both.

Each of the sites 202, 204 and 206 can include one or more firewalls 222, one or more switches 224, one or more routers 226, other computer or electronic devices (not shown in FIG. 2), or a combination thereof. The other computer or electronic devices may or may not be part of solution stacks 210, 212 and 214. Any of the solution stacks 210, 212 and 214, or an asset thereof, can be communicatively coupled to the one or more firewalls 222, the one or more switches 224 and/or the one or more routers 226. For example, at each site 202, 204 or 206 the corresponding firewall(s) 222 can monitor and control communications between a solution sub-stack in that site with other solution sub-stacks, other computer sub-systems and/or other assets in that site. The firewall 222 at a given site 202, 204 or 206 can monitor and control communications with entities outside the site. In some implementations, the firewall 22, the switches 224 and/or the routers 226 can be part of the solution stacks 210, 212 and/or 214.

Distinct solution stacks or distinct solution sub-stacks, e.g., associated with distinct solutions, may share one or more assets. For example, a firewall 222 can be part of two distinct solution stacks or distinct solution sub-stacks. While FIG. 2 provides an example illustration of solution stacks, e.g., solution stacks 210, 212 and 214, integrated in a computer environment 200, such illustration is not limiting, for example, with respect to the number of solution stacks in computer environment 200, the distribution of a solution stack among one or more sites, the number of assets in each solution stack, the interconnection between assets within a given solution stack, the connections between any solution stack and other assets of the computer environment 200, among others.

A solution, or a corresponding solution stack, can include one or more assets, one or more sub-solutions, or a combination thereof. A sub-solution can be viewed as a relatively small solution embedded within another larger solution. A sub-solution can include corresponding assets, but may not include other solutions or sub-solutions. A solution can include assets, sub-solutions, other solutions or a combination thereof. For example, one or more domain controllers can form a sub-solution for handling security authentication requests. SKYPE for Business is an example of a solution that includes a security authentication sub-solution, e.g., one or more domain controllers, and one or more other assets.

A super solution can include a plurality of solutions. In some implementations, a super solution can be a group of solutions. Two or more solutions of the group of solutions can share one or more assets. An example of a super solution can be a unified communication system including the solutions SKYPE for Business, MICROSOFT EXCHANGE, and a teleconferencing system can be viewed as a super solution. A super solution can be monitored or assessed as one entity. In some implementations, the computer environment 200 can include one or more super solutions, one or more solutions, one or more sub-solutions or a combination thereof.

The solution stacks 210, 212 and/or 214 can be defined within one layer or level, or across a plurality of layers or levels. For instance, the solution stacks 210, 212 and/or 214 can be defined at the servers' level, at the virtualization layer, at the network layer or level, or at the application layer, among others. For example, a solution that is implemented using virtual machines can be defined in terms of such virtual machines and corresponding virtualization host(s). In some implementations, the solution stacks 210, 212 and/or 214 can be defined across all layers or levels, for example, from the application layer all the way down to the electrical or physical layer. In such implementations, the solution stacks 210, 212 and/or 214 can include a combination of software assets, computing devices, network devices, and power supply devices, among others assets associated with various layers or levels. When considering all layers or levels, the solution stack can be defined as a complete set of software and/or hardware assets involved in performing the corresponding solution or the function(s) associated with the solution.

The computer environment 200 can include, or can be communicatively coupled to, a computer environment monitoring (CEM) system 228. The CEM system 228 can include one or more computing devices 230 for executing the CEM software 120 described with respect to FIG. 1C. The one or more computing devices 230 can be similar to the computing device 100 of FIG. 1C. In some implementations, the one or more computing devices 230 of the CEM system 228, or a subset thereof, can be arranged at one of the sites 202, 204 or 206. The CEM system 228 can include a computing device 230 located at a remote location from all sites 202, 204 and 206. The CEM system 228 can be configured to perform methods described in this disclosure.

The computing device 100 depicted in, and described in with regard to, FIGS. 1C and 1D can represent the architecture of the CEM system 228, devices thereof, or other devices of the computer ecosystem 200. The servers 106 shown in FIG. 1A can represent servers of the computer ecosystem 200. Some of the hardware, software and/or data assets of the computer ecosystem 200 can be located in the cloud 108, as shown in FIG. 1B. The client devices 102 shown in FIGS. 1A and 1B can represent client devices of the computer ecosystem 200 or client devices accessing the computer ecosystem 200. As used herein, a subsystem of the computer ecosystem 200 can include one or more solution stacks, a portion of a solution stack or a subset of the assets (e.g., associated with a geolocation, a manufacturer or vendor, an asset type, or an operating system, among others) of the computer ecosystem 200.

Figure 3:
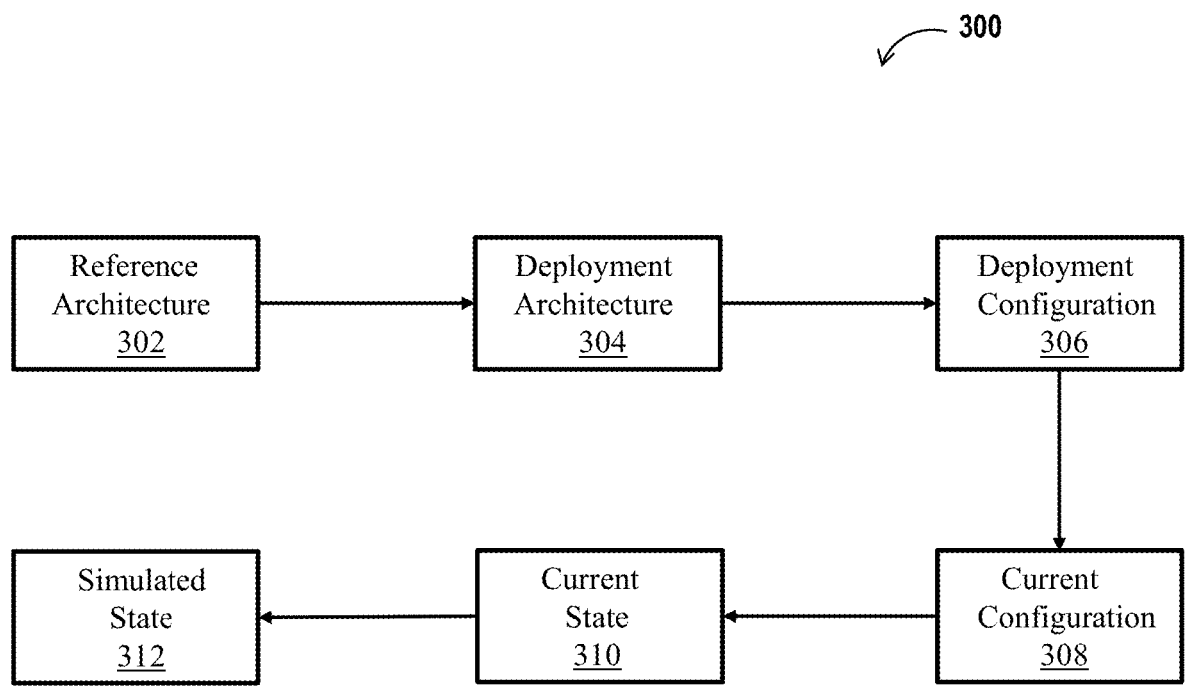
FIG. 3 shows a block diagram illustrating various phases, states or aspects of a solution or subsystem.

Referring to FIG. 3, a block diagram illustrating various phases, states or aspects 300 of a solution or a subsystem is shown. The various phases, states or aspects 300 can include a reference architecture 302, a deployment architecture 304, a deployment configuration 306, a current configuration 308, a current state 310, and/or a simulated state 312. These phases, states or aspects may not be all available for each solution. For instance, only a subset of these phases, states or aspects 300 can be available. The various phases, states or aspects 300 can be associated with distinct stages of a lifecycle of the solution or the respective solution stack.

The reference architecture 302 can represent a recommended or desired architecture, for example, provided or specified by a vendor or an architect of the solution or the subsystem. The reference architecture can specify, for example, the hardware and software assets to form the solution or the subsystem, the interconnections between various assets, the hardware host(s) for each software asset, or a combination thereof. The reference architecture 302 can specify, or can include, one or more configuration settings for one or more assets of the solution stack or subsystem or other assets of the computer environment 200 in which the solution stack or subsystem is to be integrated. The reference architecture 302 may specify one or more requirements or parameters related to, for example, high availability, disaster recovery, business continuity, operational recovery, resiliency, or a combination thereof, among others. Information indicative of, or associated with, the reference architecture 302 can be provided as input to the CEM system 228, or obtained from a database or asset of the computer environment 200.

The deployment architecture 304 can represent an architecture of the solution stack or subsystem as initially deployed or integrated in the computer environment 200. The deployment architecture 304 may or may not be in conformity with the reference architecture 302. For example, as discussed above, the solution or solution stack or subsystem may be deployed with less or more hardware assets, or with assets having different capabilities than those specified in the reference architecture 302. According to another example, the solution stack or subsystem may be deployed with interconnections between various assets, or respective ports, that are different than the interconnections specified in the reference architecture 302. According to yet another example, one or more software assets, e.g., including databases, may be hosted on hardware assets different than those specified in the reference architecture 302. Information indicative of, or associated with, the deployment architecture 304 can be provided as input to the CEM system 228, or can be obtained from a database or asset of the computer environment 200.

The deployment configuration 306 can include, or can be indicative of, configuration settings for one or more assets of the solution stack or subsystem that are adopted at the time when the solution stack or subsystem is initially deployed within the computer environment 200. Similar to the deployment architecture 304, the deployment architecture 306 may not conform with configuration settings specified in the reference architecture 302. Also, the deployment configuration 306 may or may not conform, for example, with security specifications, compliance specifications, or other specifications associated with the solution stack, or the computer environment 200. The security specifications, compliance specification, or other specifications can be listed or described as part of the reference architecture 302 or otherwise provided by a vendor of the solution or through an online resource or database. Discrepancies between deployment configuration 306 and other settings or specifications, e.g., related to the solution stack or the computer environment 200, can occur as a matter of choice or by mistake on the part of the person deploying the solution or corresponding solution stack. The CEM system 228 can obtain information indicative of, or associated with, the deployment configuration 306, for example, from configuration logs associated with the solution stack or assets thereof, from a database or other data source associated with the solution stack or the computer environment 200, or as input data, among others.

The current configuration 308 can include, or can be indicative of, the configuration settings of the solution stack or one or more assets thereof at a current time instant post deployment. After deployment of the solution or solution stack or subsystem, a user or an asset of the computer environment 200, such as firewall 222 or a computer server, among others, can modify the configuration settings adopted at the time of deployment. For example, a system administrator may intentionally or inadvertently modify one or more configuration settings associated with one or more assets of the solution stack. An asset of the computer environment 200 may automatically modify one or more configuration settings associated with one or more other assets of the solution stack or subsystem, for example, due to conflict with other configuration settings, such as security or compliance settings, associated with the computer environment 200. The CEM system 228 can obtain information indicative of, or associated with, the current configuration 308, for example, from one or more assets of the solution stack, or configuration logs associated with the solution stack or the computer environment 200, among others.

The current state 310 can represent a current situation of the solution or subsystem from one or more perspectives. For instance, the current state 310 can include information related to, or indicative of, a current architecture of the solution stack or subsystem. The current architecture can include assets currently forming the solution stack or subsystem and corresponding interconnections. The current architecture may be similar to, or different from the deployment architecture 304 and/or the reference architecture 302. The current state 310 can include information related to, or indicative of, the current configuration 308. In some implementations, the current configuration 308 can be part of the current state 310. The current state 310 can include information related to, or indicative of, a current operational state. The current operational state can include, for example, information or parameters indicative of which assets are down, processing performance of one or more assets, networking performance of one or more assets, percentage usage of resources for one or more assets, redundancies, disaster recovery, operational recovery, high availability, operational recovery or a combination thereof, among others. The current state 310 can include information related, or indicative of, a current security state. The current security state can include, for example, information or parameters indicative of current vulnerabilities for one or more assets, resiliency, current security risks at the asset level or the solution stack level, or a combination thereof, among others.

The CEM system 228 can obtain information indicative of, or associated with, the current state 310 from one or more data sources, such as vulnerability scanners, assets of the solution stack, subsystem or the computer environment 200, logs of the solution stack, subsystem or the computer environment 200, databases or online information resources (e.g., web sites, webpages or client application pages) of vendors of the solution or assets thereof, or a combination thereof. For example, the CEM system 220 can profile, or cause another system or device to profile, one or more assets of the solution stack, the subsystem or of the computer environment 200. The CEM system 228 can compare and/or merge data received from a plurality of data sources. For example, the CEM system 228 can compare data received from various vulnerability scanners with respect to one or more parameters of the solution stack, the subsystem or an asset thereof. The CEM system 228 can profile, or cause the profiling of, one or more assets, for example, to resolve a conflict or inconsistency in data from various vulnerability scanner or other data sources.

The CEM system 228 can analyze information received from the data sources, e.g., a combination of asset communication activity information, communication or configuration logs, physical or logical interconnection data, Internet protocol (IP) addresses, processing power usage data, memory or storage usage data, network resources usage data, and/or power resources usage data, to deduce additional parameters of the current state 210. For example, the CEM system 228 can use communication activity information, communication logs, and/or security zone(s) for one or more assets of the solution stack or subsystem to deduce a parameter value indicative of whether or not the solution stack complies with a security specification (or requirement). According to another example, the CEM system 228 can use information indicative of current architecture and/or descriptions of one or more assets of the solution stack or subsystem to deduce a parameter value indicative of redundancy or of failure risk for the solution stack or subsystem.

The simulated state 312 can represent a state of a simulated scenario of the solution or the subsystem. The CEM system 228 can simulate, or cause simulation of, one or more hypothetical versions of the solution stack or subsystem, for example, in terms of the architecture, configuration or other aspects of the solution stack. The CEM system 228 can define or construct a modified or hypothetical version of the solution stack or subsystem that is, for example, different from the current state 310 of the solution stack or subsystem with respect to one or more aspects or features, and simulate the modified or hypothetical version of the solution stack or subsystem to assess effect of the difference(s) on various assets associated with the solution stack, subsystem or the computer environment 200. For example, if the current state 310 indicates a current problem, e.g., related to the current architecture, current configuration 308, or other aspects of the solution stack or subsystem, the CEM system 228 or a component thereof can simulate a plurality of modifications of the solution stack that can be pursued to fix the problem. The simulations can provide estimates of the effects of each of the possible solution modifications on the solution stack, the computer environment 200, or components thereof. The use of simulations can help avoid or mitigate potential chaotic modifications, and pursue a relatively smooth modification path or scenario. The CEM system 228 can generate a plurality of simulation responses associated with a plurality of potential modifications. Each potential modification to the solution stack can be simulated at one or more layers, e.g., the network layer, storage layer, virtualization layer, electrical layer, or application layer, among others. The CEM system 228 can provide the plurality of simulation responses for display to a user, and the user can select one of the potential modifications to be implemented based on the simulation responses. The CEM system 228 may recommend one of the potential modifications to be implemented based on the simulation responses.

The CEM system 228 can monitor a solution stack or subsystem of the computer ecosystem 200 to assess operational health, security health or other aspects of the solution, the subsystem or respective assets in real-time or near real-time (e.g., periodically every predefined time interval). The CEM system 228 may assess the operational health, security health or other aspects of the solution or subsystem responsive to an assessment request received, for example, from a user of the CEM system 228. The CEM system 228 can assess the solution stack in various domains, such as the service domain, the infrastructure domain, the security domain or a combination thereof, among others.

Figure 4:
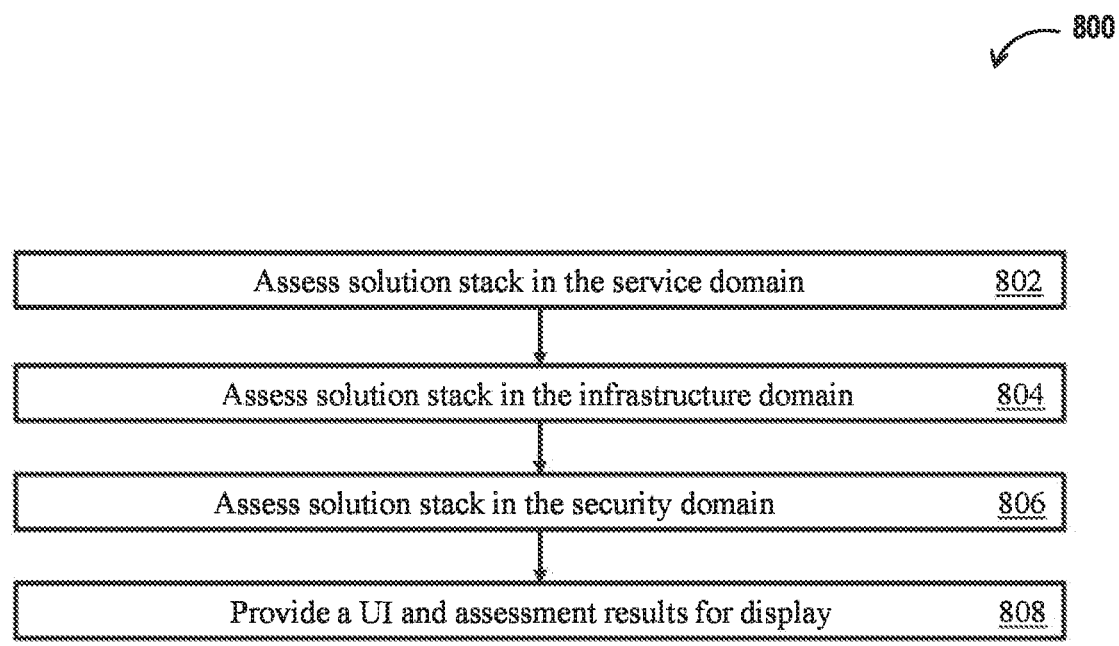
FIG. 4 shows a flowchart illustrating a method of monitoring deployed solution stacks or subsystems, according to example embodiments.

Referring to FIG. 4, a flowchart illustrating a method 400 of monitoring deployed solution stacks or subsystems of a computer ecosystem is shown, according to example embodiments of the current disclosure. The method 400 can include assessing a solution stack or subsystem in the service domain (STEP 402). The solution stack can be associated with a corresponding solution. The method 400 can include assessing the solution stack in the infrastructure domain (STEP 404). The method 800 can include assessing the solution stack in the security domain (STEP 406). The method 400 can include providing assessment results for display on a display device (STEP 408).

The method 400 can include the CEM system 228 (or a component thereof) assessing the solution stack or subsystem in the service domain (STEP 402). Assessing the solution stack or subsystem in the service domain can include the CEM system 228 checking for availability of one or more services provided by the solution or subsystem. For example, the CEM system 228 can run a script (or software code) to send a request for a given service (or to initiate a session) to the solution or subsystem. The CEM system 228 can check one or more solution responses, if any, to request sent. The solution or subsystem response(s) may include, for example, an acknowledgement of the request or an indication of initiation of the requested service on the part of the solution stack. The response(s) may include a failure or error message. The CEM system 228 can determine availability of the solution (or subsystem) or a service thereof based on, for example, the existence and/or content of responses to service requests. The CEM system 228 can check one or more assets of the solution stack or subsystem to determine whether a specific software (or application) associated with the requested service is executing thereon. The CEM system 228 can profile (e.g., send one or more requests for asset related information) the one or more assets of the solution stack or subsystem for software (or applications) running thereon and check whether the specific software (or application) is among the ones currently executing on the one or more assets. Checking for software (or applications) running on one or more assets of the solution (e.g., after sending the service request) can allow the CEM system 228 to assess whether or not the solution stack, subsystem or assets thereof are showing adequate response to the service request. In some implementations, the CEM system 228 can employ the asset profiling to diagnose the service(s) thereof at one or more granular levels. For instance, in case a service is down, the CEM system 228 can provide a detailed diagnosis of which asset(s) of the solution or subsystem is/are not available (or down).

As part of service domain assessment, the CEM system 228 can determine or estimate a performance metric indicative of, for example, a measure or ranking of the overall performance of the solution. The CEM system 228 can determine or estimate one or more performance metrics for one or more services provided by the solution. The CEM system 228 can determine the performance metric(s) for the solution and/or services thereof based on, for example, number or percentage of successful service requests (sent to the solution stack), the time duration the solution takes to respond to each request or to initiate each service, the number of successful parallel requests or a combination thereof, among others.

The method 800 can include the CEM system 228 (or a component thereof) assessing the solution stack or subsystem in the infrastructure domain (STEP 404). Assessing the solution stack or subsystem in the infrastructure domain can include the CEM system 228 checking for or determining various situational awareness attributes for various assets of the solution or subsystem. For instance, the CEM system 228 can profile one or more assets for central processing unit (CPU) usage, memory usage, network performance (e.g., transmission/reception rate, bandwidth usage, short-term packet loss, etc.), disk space, disk latency or a combination thereof, among others. The CEM system 228 can use weighted aggregations for various assets of the solution with respect to a (or each) situational awareness attribute to determine an overall performance of the solution (or a service thereof) with respect to that attribute. The infrastructure domain assessment can provide a performance assessment at the asset level.

The method 400 can include the CEM system 228 (or a component thereof) assessing the solution stack or subsystem in the security domain (STEP 406). Assessing the solution stack in the security domain can include the CEM system 228 assessing the security of the solution (or subsystem) and/or assets thereof. For instance, the CEM system 228 can check or verify security of one or more communication links, tunnels or communication transactions, data encryption, security configurations of one or more assets, security zones for various assets, vulnerabilities for various assets or a combination thereof, among others. The CEM system 228 can determine an assessment of overall security flaws for the solution, subsystem or services thereof based on these verifications.

The method 400 can include the CEM system 228 (or a component thereof) providing assessment results (or monitoring data) obtained, for example, at any of the steps 402-406 for display on a display device. The CEM system 228 can generate a visual representation of the solution stack or subsystem using the assessment data obtained during any of the steps 402-406. The visual representation may include a two-dimensional (2D) visual representation or a three-dimensional (3D) visual representation. The visual representation can be depict the architecture (e.g., assets, interconnections between assets, interdependencies between assets and/or type of each asset). The visual representation can depict the importance (or relative importance) of each asset with respect to one or more aspects of the assets. The visual representation can be an interactive representation. For instance, the visual representation can cause the display device to display additional information about an asset (e.g., asset type, asset name, asset description, IP address, asset location, configuration settings and/or operating system among others) upon interaction with a depiction (or representation) of the asset. The visual representation may be filtered, for example, to show only assets of a given type or assets satisfying some filtering criterion.

The CEM system 228 can provide various two-dimensional (2D) or three-dimensional (3D) representations of the current architecture of the solution for display on a display device. The 2D and/or 3D representations can illustrate filtered versions of the reconstructed current solution architecture. For example, the 2D and/or 3D representations can depict the current solution architecture per layer, per asset vendor, per geographical area or a combination thereof, among others.

Referring to FIGS. 5A-5D, various 2D visual representations 500A-500D illustrating various architectures associated with a SKYPE for Business solution within a given geographical location (e.g., Boston) are shown. In FIGS. 5A-5D, each square represents a corresponding asset. The lines connecting pairs of assets can represent connections between or interdependencies between the corresponding assts. The term "BOS" refers to the geolocation Boston, "CR" refers to core router, "ASW" refers to access switch, "USP" refers to un-interrupted power supply, which is an electrical apparatus that provides emergency power to a load when the input (or main) power source fails, "VS" refers to virtual server and "ST" refers to storage (or storage device).

Figure 5A:
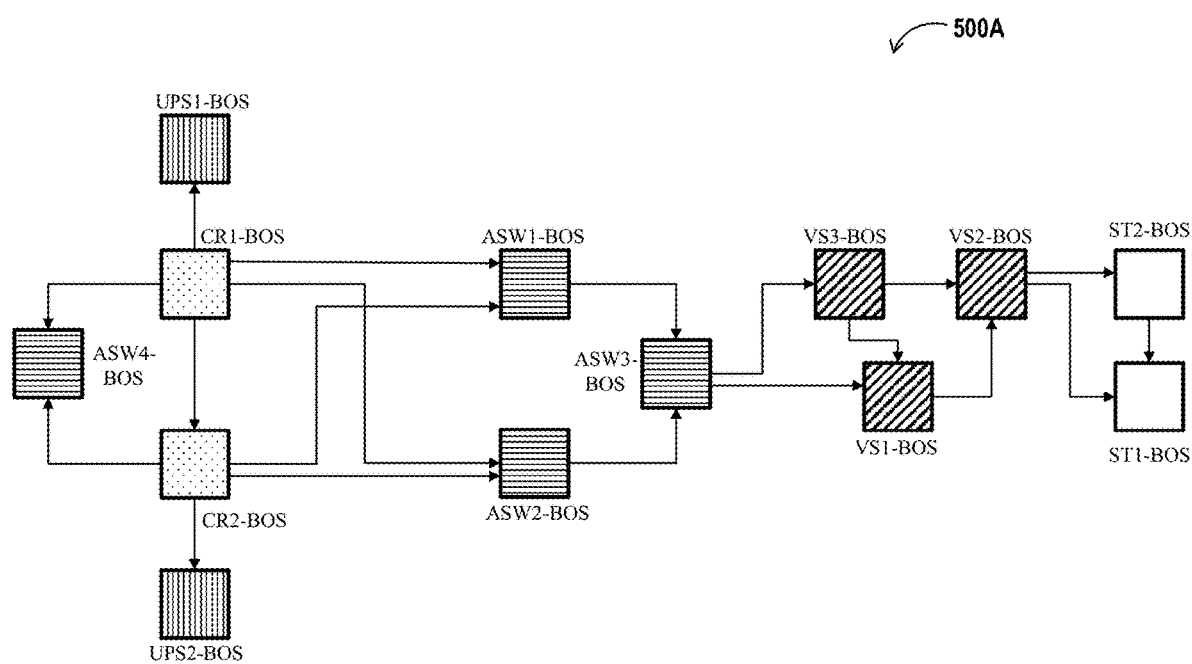
FIGS. 5A-5D show various 2D visual representations illustrating various architectures associated with a SKYPE for Business solution within a given geographical location.
Figure 5B:
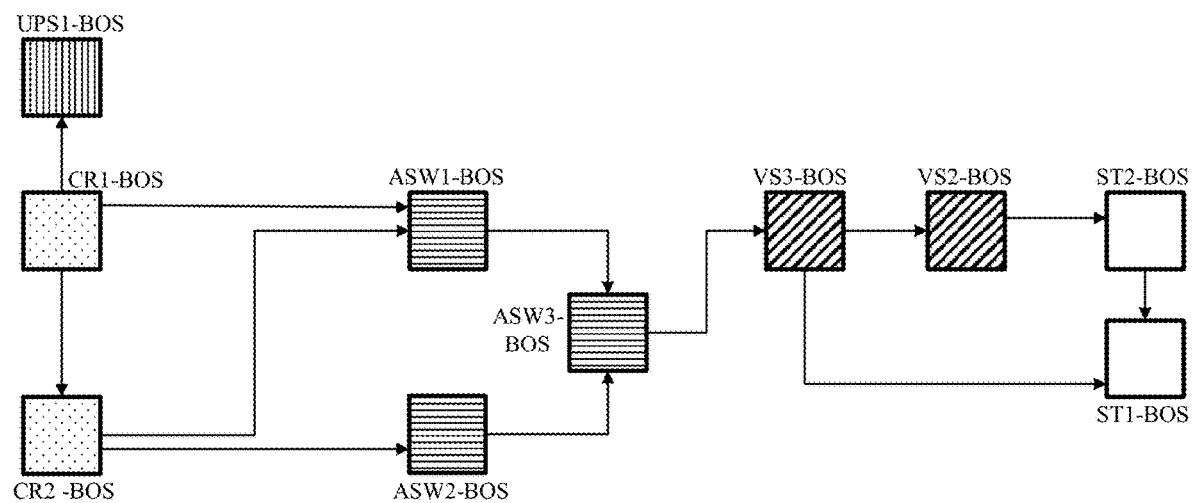
Figure 5C:
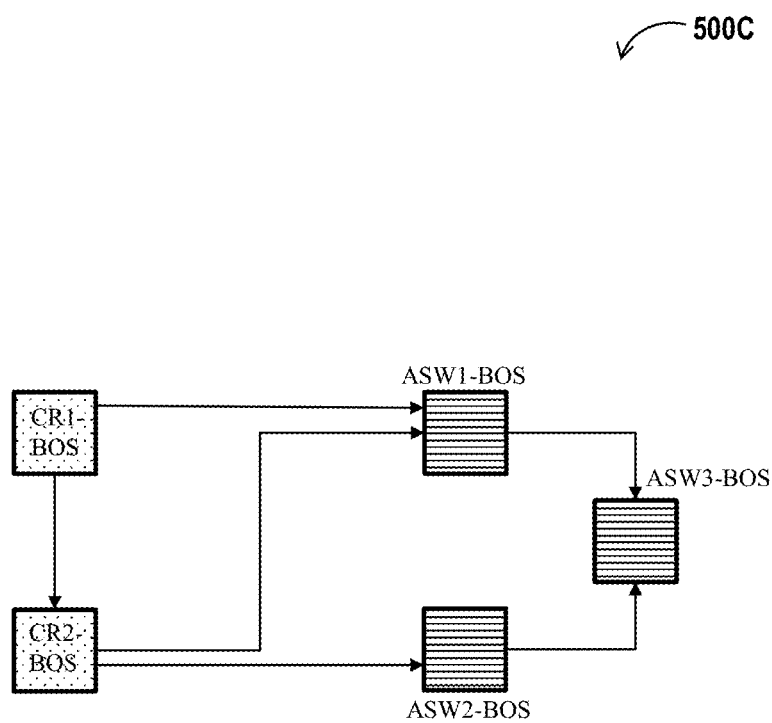
Figure 5D:
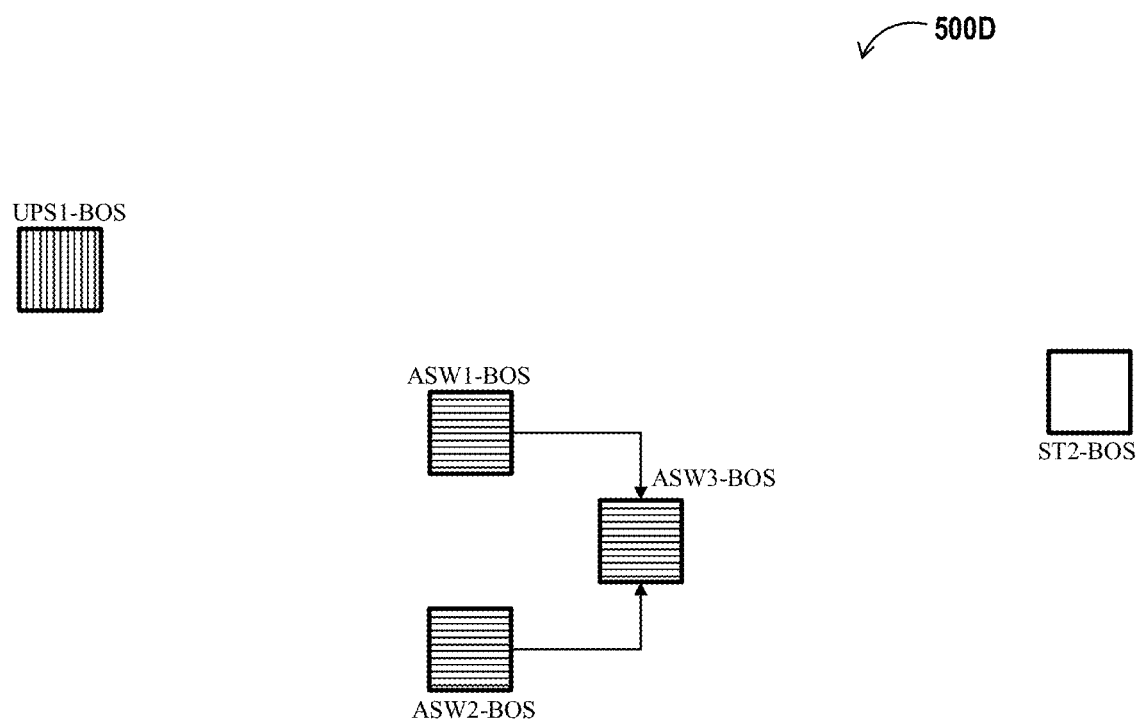
Figure 6A:
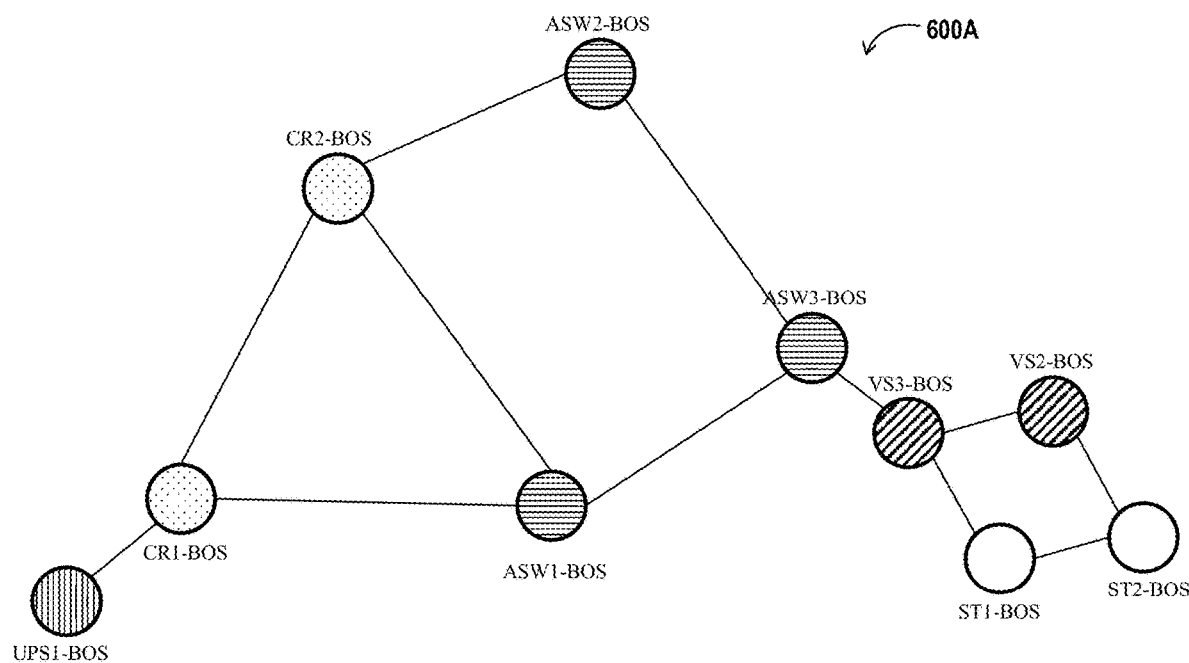
FIGS. 6A-6C show 3D visual representations of the architectures depicted in FIGS. 5B-5D of the SKYPE for Business solution are shown.
Figure 6B:
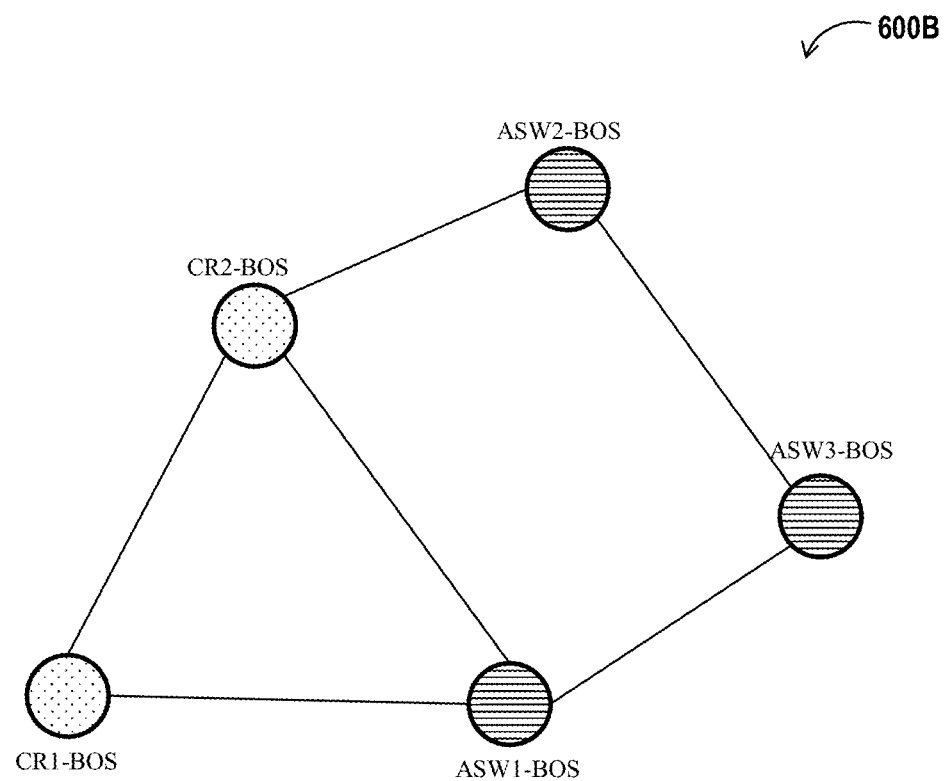
Figure 6C:
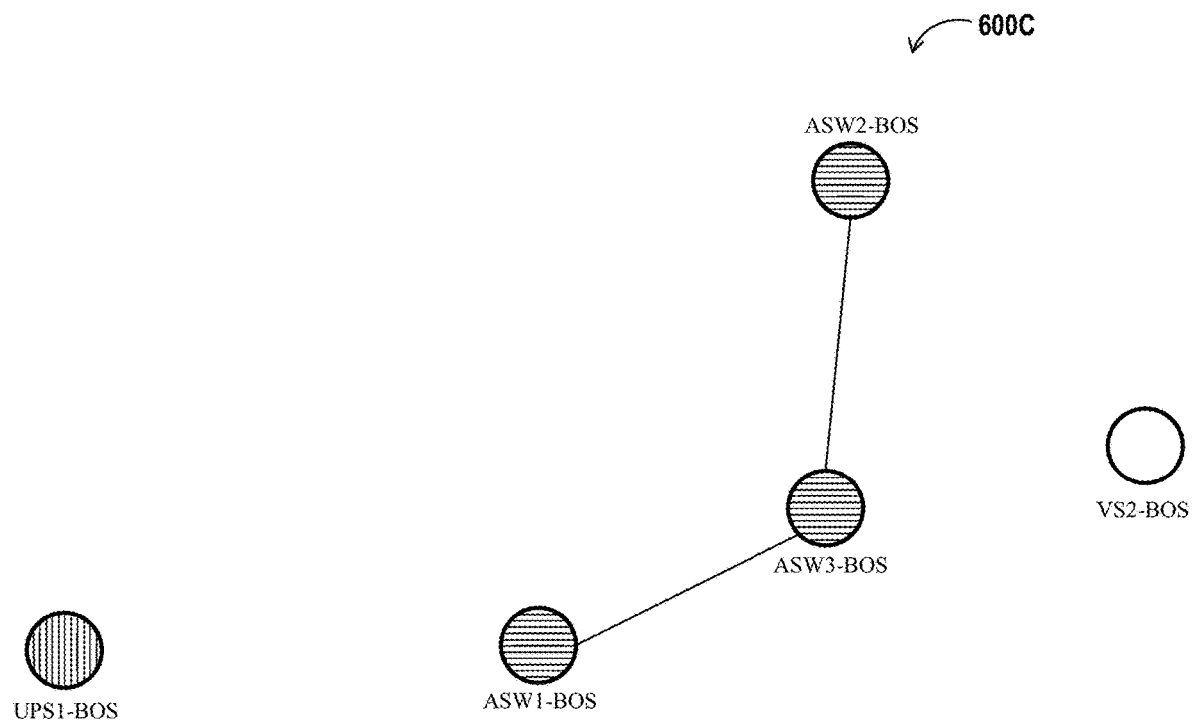

The 2D visual representation 500A in FIG. 5A represents the reference solution architecture, while the 2D visual representation 500B in FIG. 5B represents the current architecture of the solution as currently implemented. Comparing both architectures, one can see that the access switch "ASW4-BOS," the power supply "UPS2-BOS" and the virtual server "VS1-BOS" are present in the reference solution architecture 500A in FIG. 5A but not in the reconstructed current solution architecture 500B of FIG. 5B. As used herein, The 2D visual representation 500C in FIG. 5C depicts the current network layer architecture of the SKYPE for Business solution in the Boston area. In other words, the 2D representation 500C can be viewed as a filtered version (e.g., the network layer) of the current architecture of the SKYPE for Business solution in the Boston area shown in FIG. 5B. FIG. 5D shows another filter version of the current architecture of the SKYPE for Business solution in the Boston area shown in FIG. 5B. Specifically, the visual representation 500D shown in FIG. 5D depicts the subset of assets of the current architecture of the SKYPE for Business solution in the Boston area that are provided by a specific vendor (e.g., CISCO).

Referring to FIGS. 6A-6C, 3D visual representations 600A-600C of the architectures depicted in FIGS. 5B-5C of the SKYPE for Business solution in the Boston area are shown. Specifically, the 3D visual representation 600A corresponds to the 2D visual representation 500B and represents the current architecture of the SKYPE for Business solution in the Boston area. The 3D visual representations 600A-600C can be interactive allowing a user of the CEM system 228 (or a client device 102), for example, to rotate the displayed 3D representations and get different views of the architecture from different angles. As such, the user can identify single points of failure, especially where the displayed architecture is condensed (e.g., having a relatively large number of assets and/or a large number of interconnections). A single point of failure is a node (or asset) that connects two subsets of the solution assets with no other link connecting the two subsets of the solution assets. A single point of failure can be defined within one layer or across multiple layers.

Referring back to FIG. 4, the method 400 can include the CEM system 228 repeating steps 402-412 over time (e.g., periodically or regularly) for a given solution stack or subsystem of the computer ecosystem 200. The CEM system 228 may repeat the method 400 for other solutions stacks or subsystems of the computer ecosystem 200. Once the CEM system 228 constructs the current architectural and/or configuration state of a first solution, the CEM system 228 may do the same for a second solution. The CEM system 228 may generate the current architectural and/or configuration states for all, or a selected subset of, the solutions deployed in the computer environment/ecosystem 200. The CEM system 228 may generate the current architectural and/or configuration states for various deployed solutions sequentially or in parallel.

C. Solution Stack Monitoring as a Diagnosis Tool

The monitoring of solutions as described herein can allow for fast and efficient diagnosis of various IT problems associated with computer environments, such the computer environment 200. A user of the CEM system 228 can define a group of functionally related assets in the computer environment 200 as a solution and run the CEM system 228 to identify a complete solution stack and/or perform solution monitoring for the solution stack. The solution monitoring can allow for efficient and relatively fast diagnosis of performance or security issues that may arise in relation to group of functionally related assets. For example, a user may define a cluster of virtualization hosts as a solution. Virtual machines (VMs) can move across distinct virtualization hosts in the same cluster. When a VM is consuming high processing power, high memory usage or much of the network resources available, it will affect other VMs running in the same cluster. Also, one VM could be breaching some security requirements (or rules) associated with the computer environment. Given that VMs can move quite often (and possibly repeatedly within short periods of time) between the various virtualization hosts, it is difficult to track the source of the problem.

When a user defines a cluster of virtualization hosts as a solution and runs solution monitoring, the CEM system 228 can perform efficient and relatively fast diagnosis as solution monitoring allows for assessing the solution at various domains and/or various layers and providing the corresponding assessment results.

While the CEM system 228 is described herein as one system that can perform solution stack identification and monitoring, it should be appreciated that one can build separate systems for solution stack identification and solution stack monitoring to perform, for example, the methods 400 and 800, respectively. The CEM system 228 or any separate systems for solution stack identification and solution stack monitoring can include one or more hardware processors (such as processor 121 of FIGS. 1C and 1D) and a memory (e.g., memory 122 of FIGS. 1C and 1D) storing computer code instructions (e.g., CEM software 120 in FIG. 1C) thereon. The computer code instructions when executed by the one or more processors can perform any of the methods or processes described in this disclosure. The CEM system 228 can include one or more of the computing devices 100 described with regard to FIGS. 1C and 1D.

D. Identification of Mutually Independent Computer Subsystems

Cybersecurity attacks or threats can disrupt operations of computer environments, e.g., by denying access to respective data or services, jeopardizing the confidentiality or integrity of the data, damaging computer assets, or a combination thereof. The disruption can be a result of the cybersecurity attack (or threat) itself, or due to measures taken, for example, by system administrators in response to detection of the cybersecurity attack (or threat). Also, infrastructure failure or maintenance of infrastructure components can lead to similar disruptions. For example, failure of one or more computer servers can make a service or data of the computer environment inaccessible. Similarly, the data or service down time can result from shutting down, disconnecting or modifying the configuration of one or more servers during maintenance activities.

When handling a disruptive event or incident, e.g., cybersecurity attack or infrastructure failure or maintenance, in a computer environment, such as computer environment 200, respective IT administrators or other personnel usually encounter a decision making dilemma. The decision making dilemma arises especially when addressing the disruptive event or incident calls for, or involves, having one or more assets unavailable. The unavailability of the asset(s) can be a potential consequence of the incident itself. The unavailability of the asset(s) can be due to an active shut down, disconnection or segregation of the assets by the personnel, for example, as a remedial or precautious step to quarantine any actual or potential harm to the computer environment. In the case of an active shut down, disconnection or segregation of the assets, a common challenge that usually arises in the decision making process is which assets or subsystems of the computer environment are to be shut down, disconnected or segregated and which ones are to be kept online or running. The tradeoff here is that shutting down or segregating more assets or subsystems can lead to a more efficient response with respect to quarantining the harm and starting a recovery process. At the same time, the active shut down, disconnection or segregation of the assets can increase the risk of negatively affecting business continuity or the availability of services, especially critical services, provided by the computer environment 200.

To decide which assets or subsystems of the computer environment to shut down, disconnect or segregate, one may want to know the effect of such active step on the rest of the computer environment 200. In other words, the decision making process calls for knowledge of interdependencies between various assets or subsystems of the computer environment 200. However, such information may not be available at the time of decision making for various reasons. First, computer environments can be extremely large in size (e.g., thousands of respective assets) and relatively complex with respect to the respective architecture and the configurations of the assets. Second the interdependencies between the assets are usually dynamic as they change due to, for example, changes made to the architecture of the computer environment or modifications of assets' configurations made post deployment of the computer environment 200. Also, other factors such as adding or removing new software assets or new versions thereof can result in changes in the interdependencies between various assets of the computer environment 200.

Furthermore, the interdependencies between various assets of the computer environment 200 can be very complex and difficult to sort out. Specifically, a collection of interdependency data per asset for a plurality of assets can be cumbersome. For example, in a computer environment 200 having thousands of assets, it may not be practical to examine and analyze the interdependencies one asset at time when a quick decision, regarding the active step to be taken, is expected to address the disruptive event. Also, the current state of the computer environment 200, e.g., with respect to architecture, asset configurations, or data dependencies, among others, at the time of the decision making process may be in a way that the interdependencies between assets are overwhelming and do not reveal an optimal or suboptimal approach for addressing the disruptive event or incident. For instance, the degree of interdependencies for many assets (e.g., in terms of the number of other assets that depend on a given asset or the number of other assets on which the given asset depends) may be relatively very high. Also, the interdependencies between assets may seem random, e.g., not necessarily confined within solution stacks or other subsystems. In such cases, the dependency data even if available may not be helpful for the purpose of the decision making process.

Systems and methods described herein allow for identifying mutually independent computer subsystems in a computer environment, and managing the computer environment or a portion thereof using a policy determined or defined based on the identification of, or failure to identify, a state of mutual independence of the computer subsystem. A computer subsystem, in a computer environment, is in a state of mutual independency if for every asset of the computer subsystem, (i) the asset does not depend on any other asset outside the computer subsystem, and (ii) no other asset outside the computer subsystem depends on the asset of the computer subsystem. This definition implies that a mutually independent computer subsystem, at least to some degree, is self-sufficient. The definition also implies that other assets, or other subsystems, in the computer environment 200 do not rely on and/or are not affected by, at least to some degree, by the mutually independent subsystem.

In the case of a cybersecurity attack or threat, knowing that a given computer subsystem or solution is in a state of mutual independence (also referred to herein as capsule state) can facilitate the decision making process. The mutual independence state, as used herein, refers to a state of mutual independence of the computer subsystem or solution with respect to other assets, other subsystems and/or other assets of the computer environment 200. The mutual independence state allows for, for example, predicting the effect of segregating the computer subsystem on the computer subsystem itself and/or on the rest of the computer environment 200. The same applies in the case of a maintenance operation. Also, the state of mutual independence of the computer subsystem can help mitigate and manage risk factors for the computer subsystem in a more reliable and accurate way. In addition, separate and more affordable insurance plans can be allocated to mutually independent subsystems, as the respective risks can be relatively lower and more reliably monitored, for example, compared to the risks for the whole computer environment.

The state of mutual independence of a computer subsystem can be assessed, or determined, in accordance with a predefined level or degree of independency between various assets of the computer environment 200. Specifically, considering the definition of a mutually independent computer subsystem stated above, a predefined level or degree of independency can be used when determining whether an asset in the subsystem depends on any other assets outside the computer subsystem or whether any other assets outside the computer subsystem depend on the asset within the computer subsystem. Example levels or degrees of independencies can include a hard independency level, a primary independency level, a secondary independency level, or a security independency level, among others. Each independency level can be associated with a respective set of dependency types that need to be checked in order to determine whether the interdependency level is satisfied. For instance, for the hard independency level to be satisfied, there should not be any dependency of any type between the assets of the computer subsystem and any asset outside the computer subsystem. For example, a computer subsystem that is mutually independent, in accordance with hard independency, can have its own power supply, its own storage system, its own network box, its own connectivity and its own firewall.

Examples of dependency types can include power supply dependency, storage dependency, network dependency, a primary functional dependency, a secondary functional dependency, a security dependency and/or a compliance dependency, among others. A primary functional dependency can be defined as the type of dependency (between assets) that has to do with performing or executing critical (or main) functions or services of the asset or of the corresponding solution. For example, dependency on a domain controller to have network or Internet connection can be viewed as a primary functional dependency for an asset involved in providing an online service. In this case, the absence of any communication with the domain controller will not cause the asset to totally fail as the asset can still be running. However, the asset or the corresponding solution cannot provide the main or critical service or function. Also, dependency of an asset on some software of the subsystem (or solution) can be a primary functional dependency if the software is essential for the asset or the corresponding solution to provide the respective critical service or function. In general, a primary functional dependency can refer to some relationship (between assets) that is if absent will not cause an asset to fail totally, but will cause a respective critical service or function to be unavailable.

A secondary functional dependency can refer to some relationship (between assets) that is when absent will not cause an asset to fail totally and will not cause a respective critical service or function to be unavailable. However, it will cause an optional or incidental service or feature of the asset or the computer subsystem to become unavailable. For example, connection or communications with a computer server that provides email spam features or the feature of saving email attachments to cloud in an email system can be viewed as a secondary dependency. If such connection or the server itself fails, the email system can still be up and running and users will still be able to receive and send emails. However, the email spam features or the feature of saving email attachments to cloud will not be available.

A security dependency can be defined as any relationship (e.g., a connection or communications) with another asset or other subsystem, such as a firewall or an encryption/decryption module or asset, that provides one or more security functions or tasks. Also, a compliance dependency can be viewed as a relationship with another asset or other subsystem that enforces compliance with some regulations. These types of dependencies are provided here for illustrative purposes, and a person of ordinary skill in the art would appreciate that other types of dependencies can be defined or considered.

Assessing the state of mutual independence of a computer subsystem in accordance with a given dependency level can include checking each asset of the computer subsystem for dependencies of dependency types corresponding to a given independency level. For example, when considering a hard dependency level, any dependency across the boundary of the computer subsystem (e.g., between a pair of assets including one asset in the computer subsystem and another asset outside the computer subsystem) will negate the state of mutual independence. That is, all the types of dependencies are to be checked for assets of the computer subsystem. For a security independency level to be satisfied, the computer subsystem (or assets thereof) should not have security dependencies with other assets outside the computer subsystem. For example, the computer subsystem can share a power supply system or a storage system with assets outside the computer subsystem. However, all communications with assets outside the computer subsystem can be made via secure channels. Also, virtual machines and/or micro virtual machines of the computer subsystems can be stored or maintained in encrypted form in storage systems shared with other subsystems of the computer environment.

For the primary independency level to be satisfied, the computer subsystem should include all assets involved in providing the critical or main services or functions of the computer subsystem. Also, the computer subsystem should not include any asset that is involved in performing critical or main functions or services of other computer subsystems (or solutions). For the secondary independency level to be satisfied the computer subsystem should rely on only its assets in performing its critical or main functions or services as well as its secondary (or incidental) features. Also, no asset of the computer subsystem should be relied upon by any other computer subsystem for performing the main or secondary functions or services of the other computer subsystem. In other words, for the secondary independency level to be satisfied, none of the primary functional or secondary functional dependencies should exist across the boundaries of the computer subsystem.

In some implementations, when determining whether a solution (or subsystem) is in a capsule state, the dependency level to be considered can depend on, or can be dictated by, the way the solution is defined. For example, if power supply systems or devices are not part of the solution, then power independency does not have to be satisfied to achieve the capsule (or mutual independency) state. However, if the solution is defined to have its own power supply, then the capsule state requires that assets of the solution should not depend on other assets outside the solution for power supply, and the assets outside the solution should not depend on assets of the solution for power supply. Also, if a solution or subsystem is defined to have its own storage, the mutual independence state will imply that the solution or the subsystem does share a storage with assets that dot belong to the solution or the subsystem.

The above discussed independency levels are provided for illustrative purposes. Other independency levels can be defined. Also, a different number of independency levels can be defined. In some implementations, the in dependency levels or degrees can be defined according to some hierarchy, such that each independency level higher than another the hierarchy can be associated with the same dependency types plus additional dependency types. For example, a given independency type in the hierarchy can be associated with a first set of dependency types for checking. The next highest independency level in the hierarchy would be associated with the same set of dependency types plus one or more additional dependency types for checking.

Figure 7:
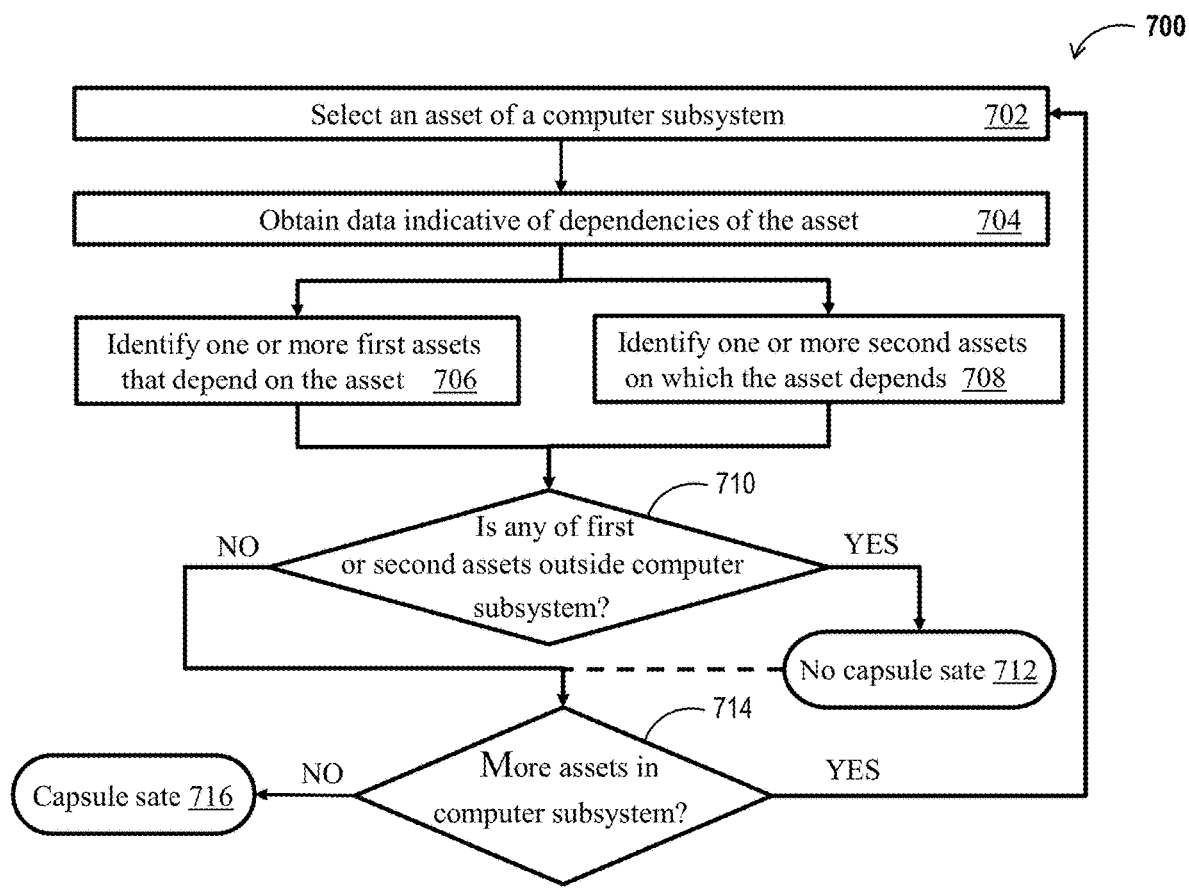
FIG. 7 shows a flowchart illustrating a method of determining whether a subsystem of the computer environment is in a mutual independence (or capsule) state, according to example embodiments.

Referring to FIG. 7, a flowchart illustrating a method 700 of determining whether a computer subsystem of the computer environment 200 is in a mutual independence (or capsule) state is shown. The method 700 can include selecting an asset of the computer subsystem (STEP 702), and obtaining data indicative of dependency information of the asset (STEP 704). The method 700 can include identifying one or more first assets of the computer environment that depend on the asset (STEP 706), and identifying one or more second assets of the computer environment on which the asset depends (STEP 708). The method 00 can include determining whether any of the one or more first assets and the one or more second assets is outside the computer subsystem (DECISION BLOCK 710). The method 00 can determining that the computer subsystem is not in mutual independence (or capsule) state if any of the one or more first assets and the one or more second assets is outside the computer subsystem (STEP 712). The method 700 can include repeating the steps in STEPs 702 to 712 for all assets in the computer subsystem (DECISION BLOCK 714). The method 700 can include determining the computer subsystem to be in a mutual independence (or capsule) state (STEP 716) if no asset within the computer subsystem depends on another asset outside the computer subsystem, and no asset outside the computer subsystem depends on an asset within the computer subsystem (DECISION BLOCK 714).

The method 700 can include selecting an asset of the computer subsystem (STEP 702). The method 700 can be performed by the CEM system 228 described in FIG. 2. While the CEM system 228 is described above mainly with respect to identification and monitoring of solution stacks, in general, the CEM system 228 can monitor the whole computer environment 200, any subsystem or solution stack thereof, or any group of assets thereof, among others. The CEM system 228 can execute the method 700 by processing the dependencies of the assets of the computer subsystem 200 iteratively, one asset at a time. The CEM system 228 can select, at each iteration, the asset of the computer subsystem whose dependencies are to be checked. The selection can be, for example, random or according to a pre-defined order or ranking of the assets. The CEM system 228 can select the asset using a data structure (e.g., a table) maintaining a mapping between the computer subsystem and corresponding assets.

The computer subsystem can include, for example, a solution stack, such as solution stack 210, 212 or 214, or other computer subsystem defined based on some criteria other than a corresponding solution. In general, the computer subsystem can be defined as a group of assets of the computer environment. For example, a computer subsystem of the computer environment 200 can correspond to assets of one of the geographical sites 202-206, one of the solution stacks 210, 212 and 214, an asset type (e.g., servers, network devices, storage devices, etc.), or a network layer, among others. The method 700 can include the CEM system 228 identifying the computer subsystem. The method 700 can include the CEM system 228 receiving information, e.g., from a database, a computer device or as user input, identifying the assets of the computer subsystem. In some implementations, a user can define, e.g., via a UI, the subsystem or assets thereof.

The CEM system 228 can execute the method 700 as part of a routine monitoring process of the computer environment, or responsive to a specific event. The CEM system 228 can execute the method 700 to check whether the computer subsystem is in a mutual independence (or capsule) state, and update a parameter or data record to indicate the determined state. The CEM system 228 may store the parameter or data record, e.g., in a database, provide the parameter or data record for display or both. As the architecture or asset configurations of the computer environment 200, including the computer subsystem, may change over time, the CEM system 228 can execute the method 700 on a regular basis. The CEM system 228 can execute the method 700, for example, responsive to a newly published vulnerability, detection of a cybersecurity hole, attack or threat associated with the computer environment 200, a maintenance event, or an infrastructure outage, among others. The CEM system 228 can execute the method 700 responsive to detecting or identifying an operational problem, such as an indication that and asset or a subsystem being under stress or not responsive. The CEM system 228 can execute the method 700 responsive to detecting an infrastructure or configuration discrepancy, for example, with respect to a reference architecture or reference architecture.

The method 700 can include the CEM system 228 obtaining data indicative of dependencies of the selected asset (STEP 704). The CEM system 228 can receive the data indicative of the dependencies of the selected asset from a one or more data sources. The data sources can include the selected asset, other assets of the computer environment 200, one or more vulnerability scanners, other computer system scanners, or a combination thereof, among others. For example, the CEM system 228 can profile, or can cause another device or system to profile the selected asset. The CEM system 228 can profile, cause profiling of, or query another asset of the computer environment 200, such as a communication log database, a configuration log database, network statistics database, a hypervisor (e.g., VMware workstation) or a combination thereof, among others, which may hold information about the selected asset. The CEM system 228 can cause one or more vulnerability scanners, or other system computer scanners, to scan the computer environment 200 or a portion thereof, or can access already available vulnerability scans.

The CEM system 228 can request connectivity tables, communication logs or a combination thereof, for example when profiling the selected asset of the computer subsystem, to identify other assets that are connected to or have communicated with the selected asset. The CEM system 228 can request the asset description, configuration logs, or other information of the selected asset, for example, as part of the asset profiling process. The asset description and/or the configuration logs can include, among others, asset name, asset type, asset IP address, an indication of a role or purpose of that asset, whether the asset belongs to any solution or subsystem, the operating system (OS) and/or other software associated with the asset, memory resources, processing resources, description or type of data stored in or associated with the asset, network zone, security zone, NetBios information, storage information, power source information, network information including other assets connected to the selected asset, or a combination thereof. The CEM system 228 can check one or more application programming interfaces (APIs) associated with a software or application associated with or running on the asset, for example, to determine interactions with other assets if any.

Vulnerability scanners can provide, among others, information indicative of asset names, asset types, asset resources, asset IP addresses, asset OSs, software and/or applications associated with each asset, vulnerabilities associated with each asset, or a combination thereof. The CEM system 228 can receive or access data associated with a plurality of vulnerability scanners. The CEM system 228 can compare, e.g., for a given asset or each asset of the one or more first assets, corresponding data received from various data sources and merge the data in a data structure such as a table. The communication logs can include indications of communications between the selected asset and one or more other assets of the computer environment 200, for example, within a given time period.

The CEM system 228 can filter the data collected from various sources based on, for example, an independency level or degree, such as the hard independency level, the security independency level, the primary independency level, or the secondary independency level, among others. For instance, the mutual independence (or capsule) state can be defined based on a predefined (or user selected) independency level. The independency level can be selected or set based on, for example, a purpose or application for which the mutual independence (or capsule) state is to be used. As discussed above, the independency level can define the types, or nature, of dependencies to be considered in assessing the mutual independence (or capsule) state of the computer subsystem. For example, if the mutual independence (or capsule) state is defined based on a hard dependency level, then the CEM system 228 can use data indicative of any type of dependency. However, if the mutual independence (or capsule) state is defined based on a security dependency level, then the CEM system 228 can filter the data to eliminate information indicative of power sources or storage, for example.

The method 700 can include the CEM system 228 identifying one or more first assets of the computer environment that depend on the asset (STEP 706), and identifying one or more second assets of the computer environment on which the asset depends (STEP 708). The one or more first assets can include assets of the computer environment 200 that, for example, received data from the selected asset, made API calls to the selected asset, or used any of the resources of the selected asset. The one or more second assets can include assets of the computer environment 200, for example, that transmitted data to the selected asset, that are the subject of API calls made by the selected asset, or whose respective resources are used by the selected asset.

The method 700 can include the CEM system determining whether any of the one or more first assets and the one or more second assets is outside the computer subsystem (DECISION BLOCK 710). The CEM system 228 can use data received from various sources, or request additional data, to determine whether any of the first and second assets is not within the computer subsystem. For instance, the CEM system 228 can use data from vulnerability scanners, or can profile an asset of the first or second assets identified at STEPs 706 and 708, to determine whether that asset belongs to the computer subsystem. The CEM system 228 can make the determination, for example, based on a description of the asset, of the first or second assets identified at STEPs 706 and 08, or by comparing attributes of that asset to attributes of one or more other assets of the computer subsystem.

The method 700 can include the CEM system 228 determining that the computer subsystem is not in a mutual independence (or capsule) state if any of the one or more first assets or any of the one or more second assets, identified in STEPs 706 and 708, does not belong to the computer subsystem (STEP 712). Such determination is a violation of the definition of the mutual independence (or capsule) state described above. The CEM system 228 can either stop processing other assets at this stage, or can transition to DECISION BLOCK 714 to continue checking dependencies of other assets in the computer subsystem. The CEM system 228 may update the parameter or data record to indicate that the subsystem is not in a mutual independence (or capsule) state. However, if the CEM system 228 determines that all of the one or more first assets and the one or more second assets, identified in STEPs 706 and 708, belong to the computer subsystem, then the CEM system 228 can move to DECISION BLOCK 714.

The method 700 can include the CEM system 228 repeating the steps in STEPS 702 to 712 for all assets in the computer subsystem (DECISION BLOCK 14). Once the dependencies of all the assets of the computer subsystem are processed and the CEM system 228 determines that (i) no asset of the computer subsystem is found (or determined) to depend on another asset outside the computer subsystem, and (ii) no asset outside the computer subsystem depends on an asset within the computer subsystem, the CEM system 228 can determine the computer subsystem to be in a mutual independence (or capsule) state (DECISION BLOCK 716).

The method 700 can further include the CEM system 228 identifying a risk score (or risk factor), a monitoring policy (or procedure), a cybersecurity threat response policy (or procedure), a maintenance policy (or procedure) or an insurance policy for the subsystem or to the computer environment 200, based on the determination of whether or not the computer subsystem is in a mutual independence state. For instance, the CEM system 228 can allocate a lower risk score to a computer subsystem determined to be in a mutual independence state than a risk score allocated to a non-mutual independent computer subsystem. Also, for mutually independent computer subsystems, the CEM system 228 can allocate risk scores based on the independency levels used in defining the mutual independence states for various subsystems. The stricter is the independency level, the lower is the risk score allocated to the corresponding mutually independent computer subsystem. For example, a relatively low risk score can be allocated to a computer subsystem having a mutual independence state defined based on the hard independency level because such state implies a high level of segregation of the computer subsystem from the rest of the computer environment 200, therefore, eliminating most of the potential risk factors. In contrast, a computer subsystem having a mutual independence state defined based on the security independency level can still share, for example, a storage system or a power supply system with other subsystems or assets of the computer environment 200. As such, the mutual independence state defined based on the security independency level does eliminate some of the potential risk factors associated with the shared storage or power supply system.

The CEM system 228 can assign or select an insurance policy, among a plurality of policies, to the computer subsystem based on the mutual independence (or capsule) state of the computer subsystem. As discussed above, the potential risks or a risk score associated with a computer subsystem can depend on the existence (or absence) of a respective mutual independence state and the type of independency level based on which such state is defined. As the allocation of insurance policies to computer subsystems takes into account the nature and amount of potential risk for the computer subsystem to be insured, the CEM system 228 can select and assign an insurance policy, among a plurality of policies, to the computer subsystem based on the mutual independence (or capsule) state of the computer subsystem and/or the corresponding independency level used in defining that mutual independence (or capsule) state.

For example, the CEM system 228 can assign a relatively cheap or favorable insurance policy to a computer subsystem determined to be in a mutual independence state than an insurance policy assigned to another computer subsystem determined not to be in a mutual independence state. Also, the CEM system 228 can assign a relatively cheap or favorable insurance policy to a computer subsystem having a mutual independence state defined based on a relatively strict independency level (e.g., hard independency level) than another insurance policy assigned to another computer subsystem having a mutual independence state defined based on a less strict independency level (e.g., security independency level). The CEM system 228 can identify a respective set of potential risks (or risk factors) for each type of mutual independence state defined based on a corresponding independency level, and the map respective set of potential risks (or risk factors) to an appropriate insurance policy. In some implementations, the mapping can be based on risk scores allocated to various types of mutual independence states.

The CEM system 228 can determine a monitoring method or procedure, e.g., among a plurality of methods or procedures, for applying to the computer subsystem or other parts of the computer environment 200 based on the mutual independence state of the computer subsystem. The plurality of monitoring methods can be associated with distinct monitoring frequencies, different monitoring depths or degrees (e.g., in terms of the type and amount of information checked as part of the monitoring process), or different types or subsets of assets to be monitored, among others. The CEM system 228 can determine the monitoring method for the computer subsystem based on the potential risks (or risk factors) associated with the computer subsystem given the existence (or absence) of a mutual independence state of the computer subsystem and the type of such state (e.g., with respect to the corresponding independency level). For instance, more frequent and/or deeper monitoring can be desired for non-mutually independent computer subsystems, e.g., compared to mutually independent computer subsystems, as the formers can be exposed to more, and probably more severe, risk factors. Also, for mutually independent computer subsystems, the assets to be monitored can depend on the types of mutual independence states. For example, for a mutual independence state defined based on a security independency level, there can be sharing of storage systems and/or power supply systems with other assets or subsystems. Accordingly, it would desirable to apply more frequent and/or deeper monitoring to the shared systems than assets of the mutually independent system.

The CEM system 228 can determine a maintenance method for applying to the computer subsystem or other parts of the computer environment 200 based on the mutual independence state of the computer subsystem. For example, when a storage system is to go offline for maintenance reason, the type of mutual independence state of a given computer subsystem can indicate whether or not the computer subsystem can be affected.

The CEM system 228 can determine a cybersecurity response procedure or approach based on the existence (or absence) of a mutual independence state for a computer subsystem, and/or the type of independency level based on which such state (if any) is defined. For example, the CEM system 228 can determine a segregation level to be applied to the computer subsystem or other assets, a monitoring level, or other security measures based on the existence (or absence) of a mutual independence state and/or it type.

Figure 8:
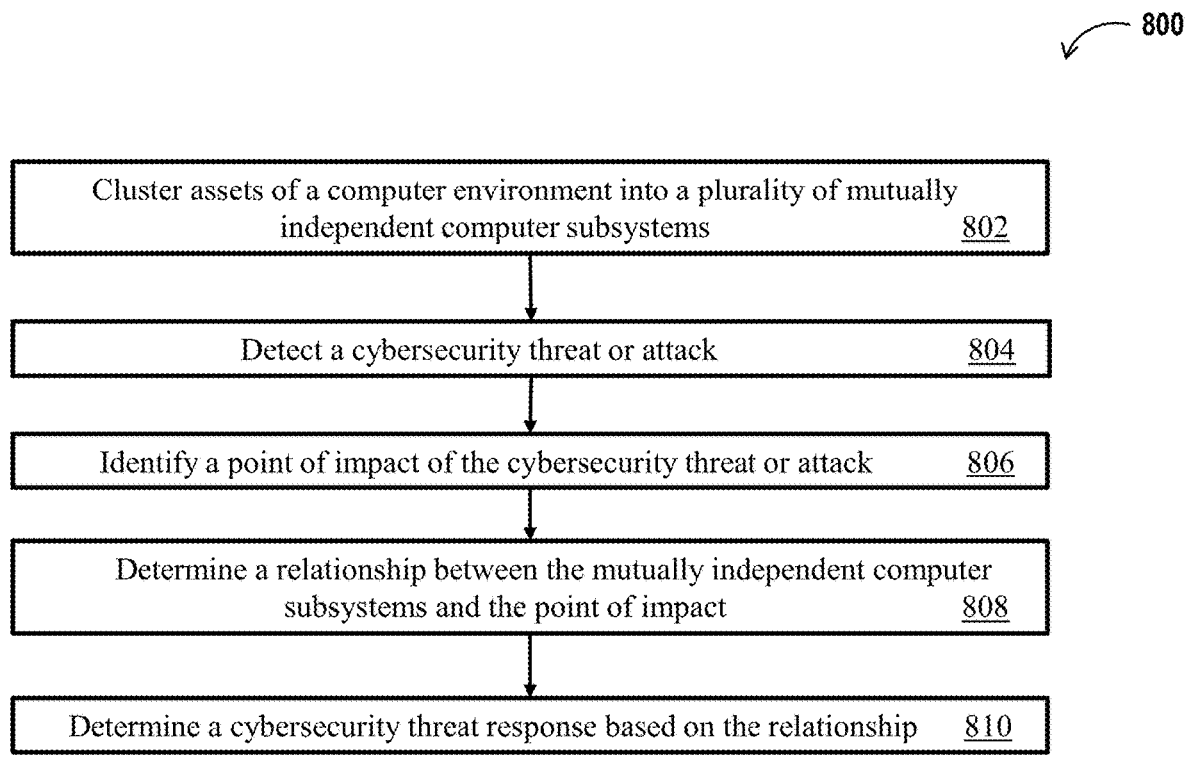
FIG. 8 shows a flowchart illustrating a method for cybersecurity threat response, according to example embodiments.

FIG. 8 shows a flowchart illustrating a method 800 for cybersecurity threat response, according to example embodiments. The method 800 can include clustering at least a subset of assets of a computer environment into a plurality of mutually independent subsystems (STEP 802). The CEM system 228 can cluster the assets of the computer environment 200, for example, using method 700 of FIG. 7. The method 800 can include detecting a cybersecurity threat or attack (STEP 804), and identifying a point of impact, within the computer environment, of the cybersecurity threat or attack (STEP 806). The point of impact can include an asset affected by, or vulnerable to, the cybersecurity threat or attack. The CEM system 228 can identify one or more points of impact based on, for example, a type or description of the cybersecurity threat or attack, asset descriptions, abnormal activities of one or more assets, or a combination thereof, among others. The method 800 can include determining a relationship between the point of impact and a first mutually independent subsystem of the plurality of mutually independent subsystems (STEP 808). The relationship can be indicative of, for example, (i) whether the point of impact belongs to the first subsystem, (ii) whether the first subsystem depends in anyway on the point of impact, or a combination thereof, among others. The method 800 can include determining a cybersecurity threat response based on the relationship between the point of impact and a first mutually independent subsystem (STEP 810). For example, the CEM system 128 can determine a segregation level to be applied to the point of impact, the first computer subsystem or other assets based on the relationship.

Figure 9:
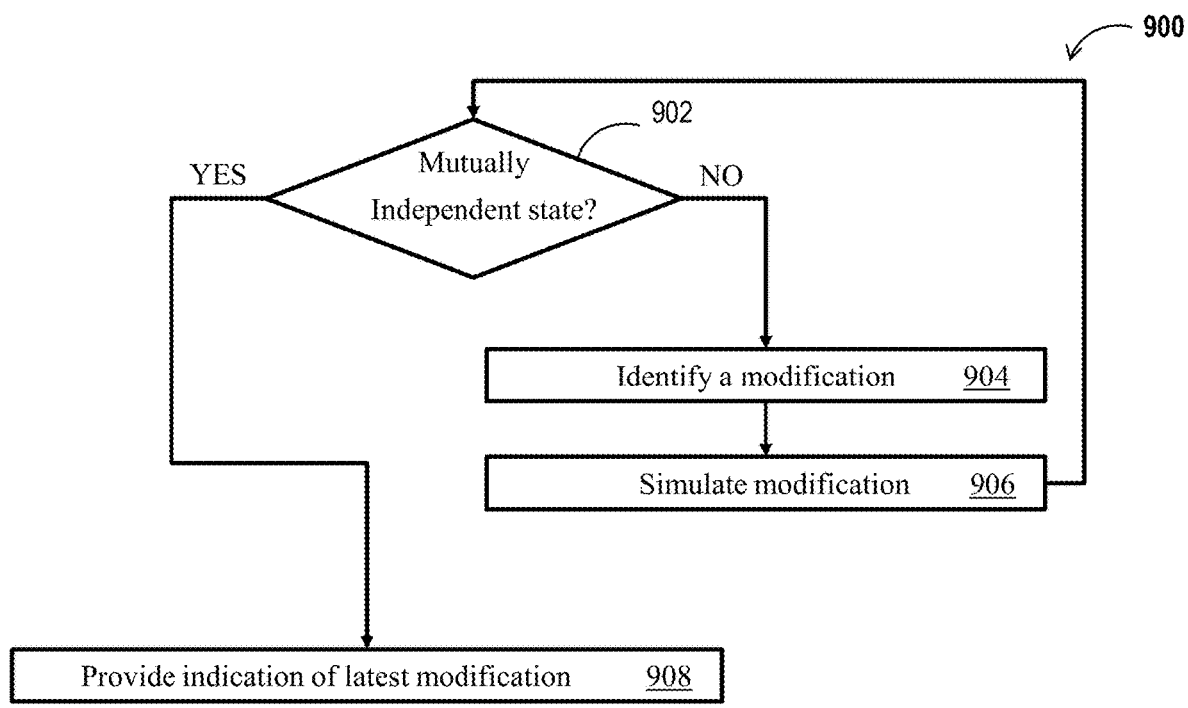
FIG. 9 shows a flowchart illustrating a method for providing architectural or configuration modifications of a computer environment, according to example embodiments.

FIG. 9 shows a flowchart illustrating a method 900 for providing architectural or configuration modifications of a computer environment, according to example embodiments. The method 900 can include identifying whether a computer subsystem is in a mutual independence state (DECISION BLOCK 902). The CEM system 228 can execute method 700 of FIG. 7 to determine whether or not the computer subsystem is in a mutual independence state. The method 900 can include identifying an architectural or configuration modification to the computer environment (STEP 904), and simulating the identified architectural or configuration modification (STEP 906). The CEM system 228 can determine, for example, a modification to be applied to the computer environment 200 based on the asset of the computer subsystem that failed the mutual independence state definition. The CEM system 228 can determine such asset as an asset that results in ending in STEP 712 when executing of the method 700 of FIG. 7. The CEM system 228 can, for example, determine a modification that includes adding another asset to the computer subsystem or modifying a configuration or connection associated with the computer subsystem or the computer environment 200. The CEM 228 can simulate the modified computer environment to determine the effect of the determined modification on the computer environment 200 including the computer subsystem. The method 900 can include repeating steps 902 through 906 for the simulated computer environment (including computer subsystem) until the computer subsystem (within the simulated computer environment) is determined to have a mutual independence state (DECISION BLOCK 902), and providing an indication of the latest modification (STEP 908).

The CEM system 228 can execute the method 900 to provide suggestions on how to redesign or reconfigure at least a part of the computer environment to make the computer subsystem in a mutual independence state.

Each method described in this disclosure can be carried out by computer code instructions stored on computer-readable medium. The computer code instructions, when executed by one or more processors of a computing device, can cause the computing device to perform that method.

While the disclosure has been particularly shown and described with reference to specific embodiments, it should be understood by those skilled in the art that various changes in form and detail may be made therein without departing from the spirit and scope of the invention described in this disclosure.

While this disclosure contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The invention claimed is:

1. A system comprising:
one or more processors and a memory configured to cause the system to:
obtain information indicative of a group of assets of a subsystem of a computer environment;
for each asset of the group of assets,
receive electronic data indicative of dependencies of the asset, the electronic data comprising at least one of connectivity data of the asset, one or more communication logs of the asset, one or more configuration logs of the asset or one or more application programming interfaces (APIs) associated with the asset;
identify, based on the electronic data indicative of the dependencies of the asset, one or more corresponding first assets of the computer environment on which the asset depends and one or more corresponding second assets of the computer environment that depend on the asset; and
determine whether the one or more corresponding first assets and the one or more corresponding second assets belong to the group of assets;
determine that the subsystem of the computer environment is in a mutual independence state upon determining, for each asset of the group of assets, that the one or more corresponding first assets and the one or more corresponding second assets belong to the group of assets; and
update, responsive to determining that the subsystem of the computer environment is in a mutual independence state, a data record to indicate that the subsystem of the computer environment is in a mutual independence state.

2. The system of claim 1, wherein the one or more processors and the memory are configured to cause the system to identify, for each asset of the group of assets, the one or more corresponding first assets and the one or more corresponding second assets according to a first dependency level of a plurality of dependency levels.

3. The system of claim 2, wherein each dependency level of the plurality of dependency levels is defined by a set of dependency types, the one or more corresponding first assets and the one or more corresponding second assets identified based on a first set of dependency types defining the first dependency level.

4. The system of claim 3, wherein the one or more processors and the memory are configured to cause the system to:
determine that the subsystem of the computer environment is not in a mutual independence state upon determining, for any asset of the group of assets, that at least one of the one or more corresponding first assets and the one or more corresponding second assets does not belong to the group of assets; and
update the data record to indicate that the subsystem of the computer environment is not in a mutual independence state.

5. The system of claim 1, wherein the one or more processors and the memory are configured to cause the system to determine a risk score of the subsystem of the computer environment based on whether or not the subsystem of the computer environment is in a mutual independence state.

6. The system of claim 1, wherein the one or more processors and the memory are configured to cause the system to determine a monitoring procedure of the subsystem of the computer environment based on whether or not the subsystem of the computer environment is in a mutual independence state.

7. The system of claim 1, wherein the one or more processors and the memory are configured to cause the system to determine a maintenance procedure of the subsystem of the computer environment based on whether or not the subsystem of the computer environment is in a mutual independence state.

8. The system of claim 1, wherein an insurance policy, among a plurality of insurance policies, is selected for the subsystem of the computer environment based on whether or not the subsystem of the computer environment is in a mutual independence state.

9. The system of claim 1, wherein the one or more processors and the memory are configured to cause the system to determine a cybersecurity threat response procedure based on whether or not the subsystem of the computer environment is in a mutual independence state.

10. The system of claim 9, wherein the threat response procedure includes:
identifying a point of impact, within the computer environment, of a cybersecurity attack;
determining a type of relationship between the point of impact and the subsystem; and
determining a segregation level of the point of impact or the subsystem based on the relationship between the point of impact and the subsystem.

11. A method comprising:
obtaining, by a computing device, information indicative of a group of assets of a subsystem of a computer environment;
for each asset of the group of assets,
receiving, by the computing device, electronic data indicative dependencies of the asset, the electronic data comprising at least one of connectivity data of the asset, one or more communication logs of the asset, one or more configuration logs of the asset or one or more application programming interfaces (APIs) associated with the asset;
identifying, by the computing device based on the electronic data indicative of the dependencies of the asset, one or more corresponding first assets of the computer environment on which the asset depends and one or more corresponding second assets of the computer environment that depend on the asset; and
determining, by the computing device, whether the one or more corresponding first assets and the one or more corresponding second assets belong to the group of assets;
determining, by the computing device, that the subsystem of the computer environment is in a mutual independence state upon determining, for each asset of the group of assets, that the one or more corresponding first assets and the one or more corresponding second assets belong to the group of assets; and
updating, by the computing device, responsive to determining that the subsystem of the computer environment is in a mutual independence state, a data record to indicate that the subsystem of the computer environment is in a mutual independence state.

12. The method of claim 11, comprising:
identifying, for each asset of the group of assets, the one or more corresponding first assets and the one or more corresponding second assets according to a first dependency level of a plurality of dependency levels.

13. The method of claim 12, wherein each dependency level of the plurality of dependency levels is defined by a set of dependency types, the one or more corresponding first assets and the one or more corresponding second assets identified based on a first set of dependency types defining the first dependency level.

14. The method of claim 13, comprising:
determining that the subsystem of the computer environment is not in a mutual independence state upon determining, for any asset of the group of assets, that at least one of the one or more corresponding first assets and the one or more corresponding second assets does not belong to the group of assets; and
updating the data record to indicate that the subsystem of the computer environment is not in a mutual independence state.

15. The method of claim 11, comprising:
determining a risk score of the subsystem of the computer environment based on whether or not the subsystem of the computer environment is in a mutual independence state.

16. The method of claim 11, comprising:
determining a monitoring procedure of the subsystem of the computer environment based on whether or not the subsystem of the computer environment is in a mutual independence state.

17. The method of claim 11, comprising:
determining a maintenance procedure of the subsystem of the computer environment based on whether or not the subsystem of the computer environment is in a mutual independence state.

18. The method of claim 11, wherein an insurance policy, among a plurality of insurance policies, is selected for the subsystem of the computer environment based on whether or not the subsystem of the computer environment is in a mutual independence state.

19. The method of claim 11, comprising:
determining a cybersecurity threat response procedure based on whether or not the subsystem of the computer environment is in a mutual independence state.

20. A non-transitory computer-readable medium with computer code instructions stored thereon, the computer code instructions when executed by one or more processors cause the one or more processors to:
obtain information indicative of a group of assets of a subsystem of a computer environment;
for each asset of the group of assets,
receive electronic data indicative dependencies of the asset, the electronic data comprising at least one of connectivity data of the asset, one or more communication logs of the asset, one or more configuration logs of the asset or one or more application programming interfaces (APIs) associated with the asset;
identify, based on the electronic data indicative of the dependencies of the asset, one or more corresponding first assets of the computer environment on which the asset depends and one or more corresponding second assets of the computer environment that depend on the asset; and
determine whether the one or more corresponding first assets and the one or more corresponding second assets belong to the group of assets;
determine that the subsystem of the computer environment is in a mutual independence state upon determining, for each asset of the group of assets, that the one or more corresponding first assets and the one or more corresponding second assets belong to the group of assets; and
update, responsive to determining that the subsystem of the computer environment is in a mutual independence state, a data record to indicate that the subsystem of the computer environment is in a mutual independence state.

* * * * *